US005972118A

United States Patent [19]

Hester et al.

[11] Patent Number: 5,972,118

[45] Date of Patent: Oct. 26, 1999

[54] CONCENTRATED SULFURIC ACID HYDROLYSIS OF LIGNOCELLULOSICS

[75] Inventors: Roger D. Hester, Hattiesburg, Miss.; George E. Farina, Killen, Ala.

[73] Assignee: Tennessee Valley Authority, Muscle Shoals, Ala.

[21] Appl. No.: 08/970,554

[22] Filed: Nov. 14, 1997

Related U.S. Application Data

[63] Continuation-in-part of application No. 08/549,439, Oct. 27, 1995, abandoned.

[51] Int. Cl.[6] .............................. B01J 3/00; A01J 17/00; B28B 17/02; C13K 1/02

[52] U.S. Cl. ................................ 127/1; 127/37; 425/205; 425/208

[58] Field of Search .......................... 127/1, 37; 425/205, 425/208

[56] References Cited

U.S. PATENT DOCUMENTS

| | | | |
|---|---|---|---|
| 4,029,515 | 6/1977 | Kiminki et al. | 127/1 |
| 4,316,747 | 2/1982 | Rugg et al. | 127/28 |
| 4,316,748 | 2/1982 | Rugg et al. | 127/28 |
| 4,368,079 | 1/1983 | Rugg et al. | 127/28 |
| 4,390,375 | 6/1983 | Rugg et al. | 127/28 |
| 4,478,644 | 10/1984 | Berger et al. | 127/1 |
| 4,591,386 | 5/1986 | Rugg et al. | 127/1 |
| 5,114,488 | 5/1992 | Huber et al. | 127/1 |
| 5,188,673 | 2/1993 | Clausen et al. | 127/1 |
| 5,411,594 | 5/1995 | Brelsford | 127/1 |

*Primary Examiner*—Mark L. Bell
*Assistant Examiner*—Patricia L Hailey
*Attorney, Agent, or Firm*—Peter D. Olexy

[57] ABSTRACT

A process, system, and apparatus for effectively and economically producing fermentable sugars from cellulosic feedstocks is described. The economic viability of using wood and/or agricultural waste, containing large fractions of cellulose and hemicellulose is highly dependent on the method used for hydrolysis. Underlying the gist of this invention are newly discovered methods, means, and techniques by which both the pentosans and hexosans comprising the hemicellulose fraction of the selected feedstock and the hexosans comprising the cellulose fraction of the selected feedstock can be quickly and efficiently converted in a single pass through a single device to fermentable sugars containing minimal quantities of degradation products known to inhibit fermentation. Successful operation of this new hydrolysis process employing a new reactor design can produce fermentable sugars at rates and efficiencies previously thought unattainable by reducing the number of processing steps, pieces of equipment, and unit operation previously used.

57 Claims, 5 Drawing Sheets

CONCENTRATED SULFURIC ACID HYDROLYSIS OF LIGNOCELLULOSICS

This application is a continuation-in-part of application Ser. No. 08/549,439, filed Oct. 27, 1995, for IMPROVED CONCENTRATED SULFURIC ACID HYDROLYSIS OF LIGNOCELLULOSICS, now abandoned.

The invention herein described may be manufactured and used by or for the Government for governmental purposes without the payment to us of any royalty therefor.

INTRODUCTION

The present invention relates to both the substantial improvements in the area of utilizing lignocellulosic feedstocks to produce sugars capable of being fermented to ethanol and other products which comprised the subject matter of our parent U.S. application Ser. No. 08/549,439, filed Oct. 27, 1995, now abandoned, as well as to further improvements made thereover, and more particularly to still later work performed subsequent thereto, which later work is reflected in the new matter added herein.

Systems of the type which employ concentrated sulfuric acid for effecting hydrolysis of lignocellulosic materials offer the potential of theoretical conversion efficiencies of such feedstocks to fermentable sugars. However, these high conversion efficiencies have heretofore been achievable only by using very concentrated acid solutions and a complex processing scheme, required to minimize acid consumption within the process. The impediments associated with using very concentrated acid solutions, complex processing schemes, and consuming relatively large amounts of acid has effectively put the quietus on further commercial development of such processes.

On the other hand, systems which employ dilute sulfuric acid, rather than concentrated sulfuric acid, supra, for effecting hydrolysis of lignocellulosic materials tend to be less complex than the concentrated systems discussed supra. This is because the acid used in these dilute systems acts strictly as a catalyst for the conversion of the pentosans and hexosans to pentose and hexose sugars; therefore, much lower acid concentrations can be utilized than in concentrated acid systems in which the acid acts more as a solvent to dissolve the lignocellulosic structure making the pentosans and hexosans available for hydrolysis. As will be shown, infra, in the well developed reaction kinetics for the dilute acid systems, dilute acid systems are most efficiently operated at very high temperatures and for very short residence times. However, because these conditions also promote degradation of sugar, a practical maximum conversion of cellulose-to-glucose of only about 50 percent is possible. By comparison, a practical maximum conversion of cellulose-to-glucose in concentrated acid hydrolysis systems is about 90 percent.

Regardless of the type of acid hydrolysis system, the acid used to effect the conversion of the lignocellulose must be removed from the resulting sugar solution, known as hydrolyzate, before fermentation is possible. In the past, the conventional way of removing the acid from the hydrolyzate was through neutralization. Typically, a neutralizing agent, such as lime or calcium hydroxide, was added to the hydrolyzate. The effect of the neutralization was the formation of a precipitate, like calcium sulfate, which was then filtered from the hydrolyzate. The cost associated with the neutralization step: chemicals, equipment, manpower, and disposal has contributed to the difficulty in commercializing acid hydrolysis systems.

As discovered, described, and recently taught in Hester et al., U.S. Pat. Nos. 5,407,580, Apr. 18, 1995; 5,538,637, Jul. 23, 1996; 5,560,827, Oct. 1, 1996; 5,628,907, May 13, 1997; and 5,667,693, Sep. 16, 1997, assigned to the assignee of the instant invention, ion exclusion chromatography offers a method by which low value highly ionic species, such as sulfuric acid, can be effectively separated from nonionic species, such as sugars, in aqueous solutions. The disclosure of such an acid sugar separation system provided substantial impetus for the making of the instant invention.

As reported in our earlier work, supra, we taught a process and apparatus for continuously converting a significant portion of the hemicellulose and cellulose, present in lignocellulosic feedstocks, to fermentable sugars, primarily the pentose sugar xylose and the hexose sugar glucose, using a twin screw extruder/reactor having three zones, to wit, a mixing zone, an impregnation zone, and a reaction zone. The design parameters of the mixing zone, discussed in great detail in said parent application, are such as to ensure thorough distributive mixing of the sulfuric acid and the lignocellulosic feedstock. The design parameters of the impregnation zone which are discussed in great detail in said parent application, are such as to assure a high degree of shear to thereby promote the production of additional surface area and impregnate the acid into the cellulosic structure. The design parameters associated with the reaction zone, as also discussed in great detail in said parent application, are such as to facilitate additional particle size reduction, efficient acid dilution, heat transfer, and pumping of the hydrolysis reaction mass to maximize the conversion efficiency of the pentose and hexose sugars associated with the hemicellulose and cellulose.

Whereas the teachings in our parent application describe a process and apparatus which can be utilized with any lignocellulosic feedstocks, we now have discovered in our work subsequent thereto that some feedstocks, due to their more amorphous chemical structure and/or physical characteristics, such as particle size, may be amenable to a less rigorous hydrolysis treatment than that described in said parent application, when subjected to the excellent distributive mixing afforded by the mixing zone and the high shearing associated with the impregnation zone. Accordingly, alternatives to the reaction zone described in said parent application are also described herein and comprise the new matter added to our original invention. Thus, in those instances wherein the feedstock to our process is deemed to require less rigorous hydrolysis treatment, the reaction zone generally described in said parent application may be replaced or substituted for by another type of reaction zone which effects substantially less shearing potential. It should therefore be appreciated that the alternatives, which comprise the new matter, supra, and which may not provide for the optimum reaction zone environment may, in some cases, offer an offsetting cost effective option.

BACKGROUND OF THE INVENTION

1. Field of the Invention

Cellulose hydrolysis, as is well known, can be achieved by a number of techniques; however, the most commonly used methods for effecting cellulose hydrolysis employ the utilization of either mineral acids or enzymes. The hardware and techniques described infra, and which comprise the instant invention, relate only to the acid hydrolysis systems.

As to such acid hydrolysis systems, they have been categorized or classified by prior art investigators as either dilute or concentrated. Referring now specifically to sulfuric acid systems, dilute sulfuiric acid hydrolysis, as universally understood and practiced, is conducted with acid solutions whose effective concentration in the aqueous phase is usually less than about 10 percent. Note: unless otherwise specifically indicated, all concentrations herein are understood to be on a by weight basis. Conversely, to effect the high glucose conversion efficiencies reported in the past, and discussed infra, concentrated sulfuric acid hydrolysis systems had to be conducted with very concentrated acid solutions to ensure a minimum concentration in the aqueous phase during processing above about 70 percent. Therefore, according to the classical definitions and processing techniques adhered to in the prior art, the invention described herein falls in neither the concentrated nor the dilute category. However, for ease of understanding and convenience and further since the conditions under which the instant invention operates more closely approximates those used for concentrated acid hydrolysis, the instant process will hereinafter be described or generally categorized as a concentrated acid hydrolysis process.

Feedstocks for such cellulosic hydrolysis may be, but are not limited to, the following materials: wood; wood waste; waste paper; the cellulosic fraction of municipal solid waste; or agricultural residues such as corn stover, sugar cane bagasse, and cotton gin trash. The sugars resulting from such hydrolysis include the hexose sugars glucose, mannose, and galactose; and the pentose sugars, xylose, and arabinose.

In addition to producing such sugar products, a relatively small amount of a number of by-products originating from the other components found in the hemicellulose, or resulting from degradation of the sugars, or the extractives present in the feedstock may also be produced when cellulosic materials are hydrolyzed. For example, acetic acid, which is produced from the hydrolysis of hemicellulose, is the most prevalent by-product resulting from the hydrolysis of wood. Acetic acid is produced from the glucomannan and methylglucoronoxylan fraction of the hemicellulose. Among the by-products originating from the degradation of sugar are furfural, hydroxymethyl firfiral, and levulinic acid. The feedstock extractives consist mainly of tannins, resins, and gums. Such tannins contain polyhydroxyphenols. Condensed tannins like catechin cannot be hydrolyzed. Hydrolyzable tannins consist of gallotannins, ellagitannins, and caffetannins. A gallotannin, for example, is a single molecule of glucose combined with ten molecules of gallic acid. Resins are complex structures consisting of resin acids like carboxylic acid resin alcohols, resinotannols, and resenes. Resins often occur in mixtures with volatile oils; these mixtures, an example of which is turpentine, are known as oleoresins. The gums may be classified as polysaccharides or salts of polysaccharides and may be pentosans or hexosans. When hydrolyzed, in addition to sugars, gums, which contain a complex organic acid nucleus, form salts primarily with calcium, magnesium, and potassium.

Although lignin is inherently associated with the lignocellulosic material feedstock, it consists of a variety of phenylpropane derivatives bound in a complex network difficult to characterize and is usually considered to be unreactive (Herman F. J. Wenzel, *Chemical Technology of Wood*, Academic Press, New York, 1970). Because lignin is for the most part unreactive, it is oftentimes used as a tie element in material balance calculations.

2. Description of Prior Art

Numerous prior art investigators have discovered, taught, and disclosed a plethora of methods and/or means for hydrolyzing cellulosic materials to produce both sugars, and sugar-rich products. For instance, it has been known since at least as early as 1819 that cellulose can be hydrolyzed to yield sugar. Since that time many processes have been developed for both the concentrated acid hydrolysis process and the dilute acid hydrolysis process. Following is a brief summary of some of the more significant of these prior art processes.

In 1880, a hydrolysis process based on supersaturated or fuming hydrochloric acid was patented in Germany and was known as the “Rheinau process.” In addition to other problems, the corrosiveness of the processing environment made commercial application of same highly impractical.

Continued development of the Rheinau process led to a countercurrent operation that permitted much higher sugar concentrations. This improved process became known as the “Rheinau-Bergius process.” In spite of the major increases in sugar concentration possible with the new processing techniques, acid consumption remained a particular problem. Approximately three parts on a weight basis of 41 percent concentrated hydrochloric acid were required for each part of wood according to Wenzel, supra.

Like the hydrochloric acid processes described supra, numerous researchers have investigated the use of sulfuric acid to effect hydrolysis of lignocellulosics. These researchers have used both dilute solutions and concentrated solutions of sulfuric acid. As noted supra, typically, dilute sunlfric acid systems utilize acid solutions containing less than 10 percent sulfuric acid, while the concentrated acid systems require greater than 70 percent sulfuric acid solutions during processing. As noted earlier, it is important to remember that processes using dilute solutions of sulfuric acid, in either a single-stage or two-stage mode, are typically operated at elevated pressures and temperatures relative to concentrated acid systems. These elevated temperature processes, as will be discussed in more detail, infra, may also cause degradation of the product sugars. Sugar degradation, especially those sugars resulting from hydrolysis of hemicellulose, caused some prior art investigators to research two-step processes in which the hemicellulose would be hydrolyzed and the resultant hydrolyzate collected before cellulose hydrolysis, see, for example, Reitter, U.S. Pat. No. 4,427,453, Jan. 24, 1984. On the other hand, concentrated sulfuric acid processes utilize solutions containing more than 70 percent sulfuric acid and are able to effect hydrolysis of cellulose at or near ambient pressures.

One of, if not, the first successful applications of dilute sulfuric acid hydrolysis technology took place at the end of the 1920s with the development of the Scholler-Tomesch process. This process, which used approximately a 0.4 percent acid solution at temperatures and pressures of around 170° C. and eight atmospheres, respectively, to effect hydrolysis, employed a percolation system normally consisting of three vertical reactors.

The Scholler-Tornesch process, supra, was later brought to and tested in the United States during World War II. The results of the tests were, however, not encouraging. Due to the scarcity of ethanol during the war, the United States sponsored the development of a new dilute sulfurric acid hydrolysis process, which came to be known as the Madison process. The process, which was developed at the University of Wisconsin’s Forest Products Laboratory in Madison, differed in a number of respects from the earlier Scholler-Tornesch process. The Madison process was operated as a continuous process, whereas the Scholler-Tomesch process was limited to batch operation; therefore, the Madison process could provide for much greater throughput. In addition, the Madison process operated at a much lower liquid-to-solids ratio than the Scholler-Tornesch process: 3-to-1 versus 10-to-1, respectively, which allowed for significantly increased sugar concentrations in the resulting product.

Operation of the Madison dilute sulfuric acid hydrolysis process was practiced by first adding acid, at a concentration of approximately 0.5 percent, to the reactor. The temperature of the reactor was held at 150° C. for 30 minutes. At these conditions, almost all the pentosans and hexosans of the hemicellulose hydrolyzed. Subsequently, the resulting hemicellulose sugar rich solution was drawn off. More fresh acid was added to the residue remaining in the reactor and the temperature within same was slowly increased to 185° C. As more hydrolyzate was removed from the reactor, more fresh acid was added. Processing time for the Madison process was approximately 3 to 3.5 hours versus 15 to 18 hours for the Scholler-Tornesch process, supra. Testing of the Madison process was stopped when the war ended since thereafter the demand for ethanol was greatly reduced. Although the plant, as constructed, consisted of five reactors, only one reactor was ever operated, and then approximately for only some six months.

Later, in the 1950s, the Tennessee Valley Authority (TVA) constructed a dilute sulfuric acid hydrolysis pilot plant which was based on the Madison process: an acid concentration of 0.5 to 0.6 percent was used at a temperature of approximately 180° C. The primary difference between the Madison and TVA processes was that the TVA process employed higher pressures: 14 to 16 atmospheres versus 9 atmospheres. Total processing time was reduced from about 3 to 3.5 hours for the Madison process to about 2.5 to 3 hours in the TVA process. However, this still long processing time served to limit the commercial viability of the process by necessitating the use of very large equipment.

In the late 1970s and early 1980s, work at the University of New York lead to further development of a dilute sulfuric acid process which employed twin screw extruder technology to effect a more commercially viable dilute sulfuiric acid hydrolysis process than those discussed supra by decreasing the size of the processing equipment required. The high glucose conversions observed were made possible by exposing the feedstock to a high degree of strain through intense mixing and higher temperatures for shorter times. To effectively accomplish this a commercial model twin screw extruder was used as described in Rugg et al., U.S. Pat. Nos. 4,316,747, Feb. 23, 1982; 4,316,748, Feb. 23, 1982; 4,363,671, Dec. 14, 1982; 4,368,079, Jan. 11, 1983; 4,390,375, Jun. 28, 1983; and, 4,591,386, May 27, 1986. Twin screw extruders are designed to run starved, that is, without filling all the volume in the intermeshed flights with reaction mass. These extruders can provide for acid impregnation through intense mixing. Running starved, such impregnation is accomplished with high shear and strain and not compression pressure.

As described by Rugg et al., '375 and '386, supra, column 6, lines 1–50, the twin screw extruder/reactor was used to effect the following conditions: a reaction zone temperature of 237° C. (459° F.), a reaction zone pressure of 400 psi, and an effective acid concentration of 1.34 percent. These conditions produced a glucose conversion of 50 percent. In order to maintain the high process pressures and temperatures within the reaction zone, Rugg et al., designed their extruder/reactor to provide for a dynamic seal upstream of the reaction zone and a small diameter orifice at the reactor's discharge point. Rugg et al., '375 and '386, supra, column 7, lines 15–16, for example, although alluding to the importance of residence time, do not describe their residence times, but rather have left it up to the reader to deduce, from the information provided in column 6, lines 25–35 and column 6, lines 25–34, respectively, and the rotational speed of the screw provided in column 6, line 15 and column 6, line 13, respectively. From the information provided in this example, it would appear that the reaction mass would have a total residence time in the reactor of between 12 and 13 seconds and a reaction zone residence time of about 7 seconds. The information provided in Rugg et al., '671, column 5, lines 39–46, and the rotational speed provided in column 5, line 29; and Rugg et al., '748, column 5, lines 37–44, and the rotational speed provided in column 5, line 26, also allows the reader to deduce a total residence time, in these two examples, of approximately 11 to 12 seconds and a reaction zone residence time of about 7 seconds. As will be discussed in more detail infra, the conversion and residence times obtained by Rugg et al., in the examples referenced supra, correlate closely with well described kinetics for dilute acid hydrolysis. For example, based on the glucose conversion and conditions described in Rugg et al., '375 and '386, supra, a residence time of about 5 to 12 seconds in the reaction zone is predicted by the kinetics.

Wherein the long reaction residence times associated with previous dilute sulfuric acid hydrolysis systems contributed to their lack of commercial viability, the short reaction residence times associated with the invention of Rugg et al., may have likewise effectively prevented its use in that physically, it is much too short to effect, with mechanical means, the conditions required for efficient glucose conversion. In addition, and as will be discussed in more detail infra, the high sugar degradation rates associated with the invention of Rugg et al., may have also played an important factor in the lack of a commercialization effort.

One of the most effective, albeit energy-demanding and complicated, processes developed to date for converting lignocellulosics to sugar was developed at the United States Department of Agriculture's National Regional Research Laboratory in Peoria, Ill. The process included the following seven separate processing steps: hemicellulose (pentosan) hydrolysis, dewatering, drying, grinding, acid mixing, acid impregnation, and cellulose hydrolysis. For a detailed description of the process see J. W. Dunning et al., *Industrial and Engineering Chemistry*, Vol. 37, No. 1, January 1945, "The Saccharification of Agricultural Residues," pp. 24–29; and, Dunning et al., U.S. Pat. No. 2,450,586, Oct. 5, 1948.

As taught in Dunning et al., '586, supra, column 1, line 43 through column 2, line 49, their process included no less than seven separate steps starting with using dilute sulfuric acid, 1 to 6 percent at 100° C. to 121° C. to convert the pentosans and hexosans contained in the hemicellulose to pentose and hexose sugars. Thereafter, the cellulose and lignin rich residue that remained was collected and mechanically dewatered. The resulting residues were therein thermally dried to produce a material containing less than 2 percent moisture. The resulting very dry material was then ground to pass a 40-mesh screen and subsequently mixed with 80 to 87 percent sulfuric acid at a temperature below 40° C. The fully mixed material was then compressed under a continuously changing directional pressure above substantially 100 psi at a temperature of not more than 45° C. to impregnate the feedstock with acid. The resultant mixture was then collected and hydrolyzed to produce glucose conversions of approximately 90 percent. A more detailed discussion of impregnation is provided in J. W. Dunning et al., *Industrial and Engineering Chemistry*, supra.

In the development of their process, Dunning et al., '586, supra, relied on the well documented dilute acid hydrolysis technology, described supra, to hydrolyze the pentosans and hexosans comprising the hemicellulose. The cellulose and lignin rich residue was then taken and mechanically dewatered to remove most of the water from the residue. Thereinafter, thermal drying with a current of hot air as described in Dunning et al., '586, column 2, lines 12–14, was required to achieve the desired moisture level of 2 percent in the resultant solid residue. Column 2 further describes that the dried solid residue was ground to pass a 40-mesh screen. The dried and ground solid residue was then mixed with 0.15 to 0.55 parts of 80 to 87 percent sulfuric acid per part of cellulosic material at temperatures below 40° C. Only after all of these five steps had been carried out was the resulting solid residue subjected to continuously changing directional pressure to impregnate the acid into the cellulosic structure. As described at column 2, lines 25–35, this impregnation was effective at pressures of 100–250 psi for periods of time preferably ranging from 1 to 5 minutes at temperatures not exceeding 45° C. As described in Dunning et al., *Industrial and Engineering Chemistry*, supra, the impregnation resulted in a compression of the feedstock to 35 percent of its original volume. As further described in Dunning et. al., '586, column 6, lines 21–24, an expeller press was used. The pressure step converted the solid residue from a free flowing powder to a stiff plastic mass. The final step, in the seven step processing scheme of Dunning et al., '586, was the conveyance of the stiff plastic mass to a container into which sufficient water was added to dilute the acid to approximately 7 to 9 percent and then the pumping of the resultant slurry, under a pressure of 5 to 45 psi through a coil hydrolyzer heated to 120 to 135° C. for a period of time preferably ranging from 5 to 20 minutes.

As described in Dunning et al., *Industrial and Engineering Chemistry*, the hydrolyzate would, in a process to produce ethanol, be filtered to remove the unreacted cellulose and lignin; neutralized with lime to react the residual sulfuric acid; filtered again to remove the resultant gypsum; and fermented to produce ethanol.

In the nearly 50 years since the issuance of the '586 patent to Dunning et al., there has not been a single successful commercialization effort. The reasons for this may include the complexity of the process but most likely the high cost of recovery of acid associated with his process. The use of 80 to 85 percent sulfuric acid in the process taught by Dunning et al., '586, precludes the economical reconcentration and recycle of the acid using systems employing mechanical vapor recompression. The acid recovered from the hydrolysis process described by Dunning et al., '586, is less than 10 percent and must be reconcentrated back to 80 to 85 percent before reuse. It has been found that economical reconcentration of the acid can only be accomplished through the use of mechanical vapor recompression. Mechanical vapor recompression systems typically require about 30–50 BTUs to evaporate one pound of water. By comparison, a steam injection system would require about 1300–1500 BTUs to evaporate the same pound of water. As may be appreciated by those skilled in the art, this method of evaporation works best on solutions whose boiling point remains relatively constant during the evaporation process. Since the boiling point of sulfuric acid increases with increased concentration, application of mechanical vapor recompression for reconcentration beyond about 55 percent becomes problematic. From Perry et al., *Chemical Engineers'Handbook*, Fifth Edition, McGraw Hill-Hill Book Company, 1973 it is shown that concentrating the acid solution from 10 to 55 percent, as may be practiced in the instant invention, results in a 28° C. temperature increase in the boiling point of the acid solution, from 102 to 130° C. This temperature increase approximately represents the limits within which mechanical vapor recompression is economical. By comparison, concentrating an acid solution from 10 to the 80 percent level of Dunning et al., results in a temperature increase of 98° C.

Because of the plethora of problems associated with sulfuiric acid type hydrolysis systems, work over the last decade has all but stopped. Other research has been directed to peripherals associated with completely integrated processes. For instance, Lightsey et al., U.S. Pat. No. 5,407,817, Apr. 19, 1995, teach presegregation of municipal solid waste and pretreatment with dilute sulfuric acid to reduce heavy metal content in the recovered cellulosic component. Others have switched to studying enzymatic hydrolysis processes. Enzymatic hydrolysis could offer simple processing and high conversions. The National Renewable Energy Laboratory switched its focus to enzymatic hydrolysis of cellulose in the mid 1980s. However, development of an economical enzymatic hydrolysis process has not yet been realized.

Kinetic Analysis of Concentrated Versus Dilute Acid Hydrolysis Systems: In order that those skilled in the art may better understand why dilute acid hydrolysis processes, such as the one described by Rugg et al., should operate at the short residence times, discussed supra, to effect glucose conversion efficiencies of about 50 percent, the following kinetic analysis is provided. As will be demonstrated, infra, the short residence times deduced, supra, which are on the order of seconds, are predicted by the empirical kinetic relationships for dilute acid hydrolysis systems developed by other researchers. As will also be demonstrated from these same kinetics, longer residence times result in lower glucose conversion efficiencies due to the fact that the product sugar starts to degrade faster than it is formed. Therefore, in dilute acid hydrolysis systems, it is best to convert the lignocellulosic feedstock to sugar quickly and also remove the product sugar as quickly as possible to minimize sugar degradation. Because these high glucose conversions are only possible at these relatively short residence times, design of commercial dilute acid hydrolysis processing systems, capable of achieving these same results, becomes problematic.

To aid in understanding the significance of the instant invention, the dilute acid process described by Rugg et al., '747, '748, '671, '079, '375, and '386, supra, and the concentrated acid process described by Dunning et al., '586, will be relied on for use of comparison. For example, Rugg et al., '375 and '386, column 6, lines 63–64, and column 7, lines 1–2 teach that the reaction conditions within their process can vary between from 350° F. (177° C.) to about 545° F. (285° C.) at pressures of 135 to 1000 psi, respectively. From the steam tables, examples of which can be found in any of a variety of technical publications, such as Richard E. Balzhiser et al., *Chemical Engineering Thermodynamics*, Prentice-Hall, Inc., Englewood Cliffs, N.J., 1972, it is noted that a saturated steam temperature of 350° F. (177° C.) correlates to a saturated steam pressure of 135 psi and a saturated steam temperature of 545° F. (285° C.) correlates to a saturated steam pressure of 1000 psi, it being understood all numbers are rounded to the nearest whole number as in Rugg et al., '747, '748, '671, '079, '375, and '386, supra.

Although teaching pressures of at least 135 psi, Rugg et al., '375 claim pressures equal or exceeding only 100 psi, which, from the steam tables, correlate to a lower reaction temperature of 328° F. (164° C.). It may be deduced, therefore, that Rugg et al., '375, are referring to superheated steam at 100 psi and 350° F. Rugg et al., '375 and '386, column 6, lines 64–65 point out that reaction temperatures can exceed 545° F. depending upon the available steam pressure, and in all their examples report reaction temperatures which correspond to at least the saturated steam temperature at the pressures described. For instance, in the example provided in Rugg et al., '375 and '386, the reaction temperature listed is actually above the corresponding saturated steam temperature at the pressure given; therefore, the steam used in this example must have been superheated. In each of the single examples provided in Rugg et al., '747, '748, '671, and '079 the reaction temperatures disclosed therein correspond to the saturated steam temperatures at the given pressures.

As is now shown, the findings of Rugg et al., '747, '748, '671, '079, '375, and '386 correlate closely to the finding of other researches who investigated the kinetics of dilute sulfuric acid hydrolysis. These researchers demonstrated that the hydrolysis of cellulose to glucose, a hexose sugar, and hemicellulose to a mixture of hexose and pentose sugars, primarily xylose, could be modeled as first-order homogeneous reactions, in which the cellulose content is expressed as potential glucose and the hemicellulose content is expressed as potential xylose (J. F. Saeman, *Industrial and Engineering Chemistry*, Vol. 37, "Kinetics of Wood Saccharification," pp 43–52, January 1945). The following represent simplified reaction pathways:

cellulose→glucose→hydroxymethylfurfural hemicellulose→xylose→furfural

The rate constant for the conversion of cellulose to glucose may be called $K_1$, the rate constant for the degradation of glucose to hydroxymethyl-furfural, a degradation product, may be called $K_2$, and the rate constant for the degradation of xylose to furfural, a degradation product, may be called $K_3$.

The conversion of hemicellulose to xylose is considered to be instantaneous ($K=\infty$). Rate constants are expressed in $\min^{-1}$. The rate equations for the conversion of cellulose are shown below.

$$\frac{dC}{dt} = -K_1 C \text{ and} \qquad (1)$$

$$\frac{dG}{dt} = K_1 C - K_2 G \qquad (2)$$

where

C=cellulose concentration expressed as a fraction of potential glucose.

G=glucose concentration expressed as a fraction of potential glucose.

These rate equations can be integrated to yield an expression which gives the fraction of potential glucose present at any given time (3) and the amount of cellulose present at any time (4).

$$G = C(0)\frac{K_1}{K_1 - K_2}[\exp(-K_2 t) - \exp(-K_1 t)] \qquad (3)$$

$$C = C(0)\exp(-K_1 t) \qquad (4)$$

Where

C(0)=initial cellulose fraction.

Accounting for the acid present, the rate constants $K_1$ and $K_2$ can be calculated from Arrhenius' law as follows:

$$K_1 = k_1 A'''\exp(-E_1/RT) \qquad (5)$$

$$K_2 = k_2 A''\exp(-E_2/RT) \qquad (6)$$

Where k=preexponential factor, $\min^{-1}$

A=weight percent sulfuric acid in solution

E=activation energy, cal/gm-mol

R=gas constant, 1.987 cal/gm-mol ° K

T=absolute temperature, ° K m,n=constants

Several investigators have studied these kinetics (John F. Harris et al., "Two-Stage Dilute Sulfuric Acid Hydrolysis of Wood: An Investigations of Fundamentals," United States Department of Agriculture, Forest Products Laboratory, General Technical Report FPL45, 1985). In 1981, a research team at Dartmouth College studied these reaction kinetics (H. E. Grethlein, "Dartmouth College: Acid Hydrolysis of Cellulosic Biomass." *Alcohol Fuels Program Technical Review*. U.S. Government Printing Office: 1982-576-083/201, 1981. The values given below for cellulose hydrolysis, glucose degradation, and xylose degradation were taken from the Dartmouth study.

| | Cellulose Hydrolysis | Glucose Degradation | Xylose Degradation |
|---|---|---|---|
| $k_1$, $k_2$, $k_3$ ($\min^{-1}$) | $5.33 \times 10^{16}$ | $3.89 \times 10^{9}$ | $8.78 \times 10^{15}$ |
| m, n, p | 1.14 | 0.57 | 1.00 |
| $E_1$ ,$E_2$, $E_3$ (cal/gm-mol) | 36,955 | 20,988 | 33,560 |

Rugg et al., '375 and '386, column 6, lines 5–45 teach that by operating their process at a superheated condition of 237° C. (459° F.) at 400 psi, (i.e., the temperature of the steam is in excess of that listed for saturated steam at that pressure in the steam table), and using an effective acid concentration of 1.34 percent sulfuric acid, it is possible to convert 130 lbs/hr of dry sawdust to 40 lbs/hr of glucose and 13 lbs/hr of hydroxymethylfurfural. According to Rugg et al., '375. the glucose conversion represents 50 percent of the available cellulose. By using the kinetic data provided, supra, rate constants can be derived as follows:

$$K_1 = 5.33\times10^{16}(1.34^{1.14})\exp^{(-36955/(510\times1.987))}$$

$$K_1 = 10.81 \min^{-1}$$

and $$K_2 = 3.84\times10^{9}(1.34^{0.57})\exp^{(-20988/(510\times1.987))}$$

$$K_2 = 4.59 \min^{-1}$$

Therefore a $K_1/K_2$ ratio of approximately 2.4 can be calculated. With $K_1$ and $K_2$, the amount of glucose present as a percentage of potential glucose can be calculated using equation 3, supra. It can be readily shown that the maximum glucose conversion is approximately 53 percent at 8 seconds. At times ranging from 5 to 12 seconds a glucose conversion approximately equal to or exceeding 50 percent is obtained. This conversion closely corresponds to the 50 percent conversion claimed by Rugg et al., '375 and '386, at the time deduced, supra. Longer residence times at these conditions result in lower conversions. For example, at 30 seconds a glucose conversion of less than 17 percent is achieved, which is due to the fact that sugar is being degraded faster than it is being formed. Lower temperatures result in lower $K_1/K_2$ ratios, which indicate lower potential conversions. Operating at higher temperatures increases potential conversion, but these higher conversions are only possible at shorter residence times. For example, at 545° F. (285° C.) and 1.34 percent acid, a potential glucose conversion of 69.5 percent is possible. The $K_1/K_2$ ratio at these conditions is approximately 9.1. However, this conversion is achieved at a residence time of only 1 second. In approximately 12 seconds, essentially all the glucose has degraded. Conversely, at 350° F. (177° C.) and 1.34 percent acid, a maximum conversion of approximately 17.4 percent is obtained at about 6 minutes. At these conditions, the $K_1/K_2$ ratio is approximately 0.29. Finally, by operating the process at higher acid concentrations and lower temperatures, it is also possible to achieve high glucose conversions, however, these high glucose conversions also require short reaction times. For example, using an effective acid concentration of 10 percent at a temperature of 405° F. (207° C.) it is possible to achieve a maximum glucose conversion of 56 percent in about 9 seconds. In this case, a glucose conversion of or exceeding 50 percent is possible at residence times ranging from about 6 to 14 seconds. Longer residence times result in lower glucose conversions. The $K_1/K_2$ ratio for this case is approximately 2.8.

In order to minimize sugar degradation and achieve cellulose to sugar conversions greater than 50 percent in dilute acid hydrolysis systems, short reaction times are necessary. These short reaction times make commercial processes difficult to design, especially when operating with the large zone temperature differences, as much as 513° F. (267° C.), taught by Rugg et al., '375 and '386, column 7, lines 42–45, for example. However, as will be shown, infra, the lower temperatures associated with concentrated acid hydrolysis systems minimize sugar degradation and provide for much higher cellulose to sugar conversions.

To aid those skilled in the art in assessing the potential gains possible with concentrated acid hydrolysis systems, a kinetic analysis was conducted to determine the rate constants associated with the system of Dunning et al., supra. The ratio of the rate constants provide a tool by which it is possible to compare, in a scientific way, dilute and concentrated acid hydrolysis processes.

In 1945, the results of a study to define a continuous acid hydrolysis process which could produce glucose conversions of approximately 90 percent were published (Dunning et al., *Industrial and Engineering Chemistry*). Cellulose conversions of 89 percent were reported in these tests. The process used by Dunning et al. to achieve this conversion involved no less than seven separate and distinct steps. These steps included hemicellulose (pentosan) hydrolysis, mechanical dewatering, thermal drying, acid mixing, grinding, acid impregnation, and cellulose hydrolysis. Unlike the work conducted by Rugg et al., supra, Dunning et al. achieved acid impregnation using an expeller screw press, which compressed the feedstock to 35 percent of its initial volume under a pressure of 175 psi. The glucose conversions obtained in one of the tests described are given below. Unlike the dilute acid hydrolysis process, these conversions were achieved at a temperature of only 130° C.

| Time (min) @ 130° C. | Glucose Conversion (percent) |
|---|---|
| 1 | 20 |
| 2.5 | 60 |
| 6 | 89 |
| 10 | 87 |
| 15 | 85 |
| 20 | 82 |

Although not appreciated by Dunning et al. (*Industrial and Engineering Chemistry*), with the data generated it is possible to perform a kinetic analysis to scientifically quantify the increased performance potential of the concentrated acid hydrolysis process over the dilute acid systems, such as the dilute acid system investigated by Rugg et al., supra.

By taking the derivative of equation 3, supra, with respect to time and setting the derivative equal to zero, the following expression is obtained:

$$\exp(-K_2 t) = \frac{K_1 \exp(-K_1 t)}{K_2} \quad \text{or} \tag{7}$$

$$K_2 = K_1 - \frac{\ln\frac{K_1}{K_2}}{t} \tag{8}$$

Substituting equation 7 into equation 3 and rearranging yields the following expression:

$$\frac{G(K_1 - K_2)}{K_1 C} = \frac{K_1 \exp(-K_1 t)}{K_2} - \exp(-K_1 t) \tag{9}$$

Since the initial cellulose concentration can be set equal to one, the expression can be simplified to yield:

$$\frac{-\ln G}{t} = K_1 - \frac{\ln\frac{K_1}{K_2}}{t} \tag{10}$$

Substituting from equation 8 yields the following expressions:

$$K_2 = \frac{-\ln G}{t} \tag{11}$$

By substituting the values obtained by Dunning et al. (*Industrial and Engineering Chemistry*), for maximum glucose conversion at six minutes, a rate constant ($K_2$) of 0.019 $\text{min}^{-1}$ is obtained. The rate constant $K_1$ can now be derived using a root finding technique, such as the Newton-Raphson method. Again, from the Dunning et al. data, the rate constant $K_1$ is determined to be 0.568 $\text{min}^{-1}$. By comparing the rate constants and the $K_1/K_2$ ratios for the Dunning et al. and Rugg et al. (29.9 vs. 2.4, respectively), it will be apparent to those skilled in the art that the concentrated acid hydrolysis process is indeed far superior for achieving high conversions of sugar from cellulose at reaction mass residence times far more realistic with respect to commercial system design. As can be seen from the data of Dunning et al., supra, increasing the hydrolysis reaction time from 6 to 15 minutes results in only a 4 percent degradation of glucose.

It has been established that the hydrolysis of cellulose is, in part, limited by the accessibility of the cellulose to the acid (Wenzel, *Chemical Technology of Wood*). By combining the high shear and mixing potential of today's twin screw extruders, such as done in the dilute acid hydrolysis tests conducted by Rugg et al., supra, with the higher acid concentrations associated with concentrated acid hydrolysis systems, it is possible to deliver the acid necessary to the lignocellulosic structure that will yield results similar to those obtained by Dunning et al. (*Industrial and Engineering Chemistry* and '586), but in a simpler, more compact, more controllable, and much more economical process.

To emphasize the importance this intensive mixing plays in the impregnation process, Dunning et al., '586, column 5, line 24 through column 6, line 32, noted that when the cellulose rich residue from the hemicellulose (pentosan) hydrolysis step was dried to 50 percent moisture and combined with 85 percent sulfuric acid in a ratio of 0.53 parts acid to one part residue a conversion of only 3 percent glucose was obtained. The same residue when dried to a powder and mixed with the same amount of acid under conditions of "good agitation" then produced a conversion of 60.6 percent glucose. When this same dried residue was mixed with the same amount of acid and subjected to a two-minute pressure treatment, a conversion of 89 percent was achieved.

SUMMARY OF THE INVENTION

The instant invention utilizes certain techniques, albeit, in modified mode, previously employed in the dilute acid system described by Rugg et al., supra, but with processing conditions for temperatures and pressures which are far more mild than those employed in that system, which mild conditions serve to minimize product sugar degradation, maximize glucose conversion, decrease extruder/reactor zone temperature differences, and extend the hydrolysis reaction time for maximum glucose conversion, from seconds to minutes. Most importantly, the instant invention utilizes concentrated acid, rather than dilute acid, in such process. Accordingly, the instant invention takes advantage of the enhanced reaction kinetics associated with concentrated acid systems to achieve conversions in excess of those achievable in dilute acid systems. The instant invention greatly streamlines the very cumbersome seven-step concentrated acid process of Dunning et al., '586, supra, and provides for a more compact and economical design, much more amenable to successful commercialization. The seven steps associated with Dunning et al., '586, have been reduced, in the most preferred embodiment, to a three-zone, single-unit operation. Most importantly, the instant invention does not rely on the very concentrated acid solutions of Dunning et al., '586, which cannot be recovered and recycled economically within the process due to the energy expenditure associated with reconcentration of the recovered dilute acid. Instead, it employs an acid concentration which can take full advantage of mechanical vapor recompression reconcentration.

After a careful study of past work and many unsuccessful attempts at an economical process design, we finally discovered methods and means to make it possible to incorporate twin screw extruder/reactor technology into concentrated acid hydrolysis systems. In doing so, it became possible to dramatically decrease sugar degradation and increase glucose conversions over those taught in the dilute acid system of Rugg et al., supra. In addition, because of the relatively low pressures associated with the instant invention, there exists no need for the use of a dynamic seal such as discussed in Rugg et al., '375, '671, '748, '747, '079, and '386, supra. The use of the twin screw extruder/reactor, with its high shear potential negates the need to incorporate a separate acid mixing, grinding, and acid impregnation steps as described in Dunning et al., '586. In addition, the pumping capability of the extruder/reactor provides for a reaction zone in which residence times can be closely controlled. Since it is now possible to ferment both pentose and hexose sugars together there is no need, as in Dunning et al., '586, for separate hemicellulose (pentosan) hydrolysis and residue preparation; therefore, the practice of the instant invention reduces the seven-step procedure described by Dunning et al., '586, to a single-unit operation. But most importantly, the extruder/reactor apparatus and process, which comprises the instant invention, through its high shear potential, permits the use of a less concentrated acid solution than the one described in Dunning et al., '586, supra. The use of less concentrated acid solutions permits economical acid recovery and recycle through the use of ion exclusion chromatography as described in Hester et al., '580, '637, '827, '907, and '693, supra, and mechanical vapor recompression to reconcentrate the acid solution back up to the instant invention's most preferred limits of 50 to 57 percent.

In the principal embodiment for the most effective practice of the instant invention, a twin screw extruder/reactor is utilized, which extruder/reactor is provided with or has designed thereinto a plurality of zones. In this respect, said preferred embodiment is somewhat similar to the equipment described in Rugg et al., supra, except that the mechanical design and conditions employed therein differ greatly therefrom.

Specifically, although Rugg et al., '747, '748, '671, '079, '375, and '386 teach use of a twin screw extruder to impregnate the acid into the lignocellulosic structure, the concentration of the acid used by them ranges upwards to only about 10 percent, ('375 and '386, column 7, lines 4–5, for example). On the other hand, in the practice of the instant invention, the most preferred acid concentrations range between 50 and 57 percent. In the examples contained in Rugg et al., '748, and '671, an acid loading of 0.008 pounds of acid per pound of dry feedstock was used. In Rugg et al., '375 and '386, an acid loading of 0.03 pounds of acid per pound of feedstock was used in the example. These small acid loadings were employed since all acid used in the process is lost. However, Rugg et al., '375 and '386, column 5, lines 35–38 describe acid loadings ranging from 0.0017 to 0.4 pounds of acid per pound of feedstock. Even given the enormous range of these acid loadings, at acid concentrations no greater than 10 percent, described therein, the acid loadings remain substantially below that associated with the instant invention, which ranges between 0.42 and 2.0 pounds of acid per pound of feedstock.

Although critical to the success of acid impregnation, no information is provided in Rugg et al., '747, '748, '671, '079, '375, and '386, on the induced strain into the reaction mass. As will be described infra, specific design parameters must be adhered to induce the necessary strain that results in the physical change observed by Dunning et al., '586, column 2, lines 25–40, which makes possible optimum glucose conversions.

As may be appreciated by the reader, the extruder/reactor of Rugg et al., generally comprises three zones, including the preplug feed zone, the plug zone, and the reaction zone. From the information provided in Rugg et al., '671, column 6, lines 20–37, and column 6, lines 6–7, a maximum reactor residence time of 218 seconds, including a maximum reaction zone residence time of 100 seconds, can be deduced. As shown from the kinetics, supra, because of the rate constants associated with the formation and degradation of the sugars, the conversion claimed in the examples of Rugg et al., supra, can only be obtained at the relatively short residence times deduced supra.

As described in Rugg et al., '747, column 6, lines 9–10; '079, column 6, lines 12–13; '748, column 5, lines 58–59; '671, column 5, lines 60–61; and '375 and '386, column 6, lines 63–64, reaction zone temperatures in the reaction zone can vary between 350° F. and 545° F. (177° C. and 285° C.). These reaction zone temperatures are far in excess of those associated with practice of the instant invention, in which the most preferred operating range is 212° F. to 275° F. (100° C. to 135° C.).

The reaction pressures described by Rugg et al., '747, column 6, line 15; '079, column 6, line 18; '748, column 5, lines 64–65; '671, column 5, lines 66–67; and '375 and 386, column 7, lines 1–2, range between 135 and 1000 psi, and, as noted supra, correspond to the saturated steam temperatures at the pressures given. On the other hand, the most preferred reaction pressures utilized in the practice of the instant invention generally range between ambient and 45 psi.

In the practice of the most preferred embodiment of the instant invention, a single twin screw extruder/reactor comprised of three primary zones: mixing, impregnation, and reaction is used.

In the mixing zone, a concentrated acid solution, containing, for example, 55 percent sulfuric acid, is injected onto the entering lignocellulosic feedstock at a predetermined rate depending upon the rate of feedstock addition. The design parameters of this section of the twin screw configuration are such that thorough distributive mixing and mingling of the acid and feedstock are assured by proper design of the twin screw's helix angle and conjugation. Acid loading, in which the most preferred operating range is 0.5 to 0.8 pounds of acid per dry pound of entering feedstock, is such as to ensure total wetting of the feedstock prior to entering the impregnation zone of the extruder/reactor and to also ensure rapid protonation of the glycosidic oxygen atom during hydrolysis. Unlike the prior art investigators, who had to be concerned about acid usage and who, in the case of Rugg et al., supra, had to be concerned with low conversion efficiencies, the instant invention is designed to be operated with an acid recovery system, such as that described in Hester et al., '580, '637, '827, '907, and '693, supra. To prevent overheating of the reaction mass caused by the heat of dilution of the acid, mechanical heating (friction), and/or heat transfer from the reaction zone, a cooling jacket may be used on this section of the extruder/reactor. In addition to or in place of the cooling jacket, the individual screws can be cooled internally by circulation of heat transfer media therethrough.

Within the impregnation zone of the twin screw extruder/reactor the acid is driven into the lignocellulosic structure of the feedstock. The design parameters associated with the screws, used in the practice of the instant invention, in this zone of the extruder/reactor are such as to assure a high degree of shear. The relatively large amounts of shear energy inputted to this section of the extruder/reactor is expected to result in a substantial amount of mechanical heating. Accordingly, in order to preclude premature depolymerization of the hemicellulose and cellulose present in the feedstock caused by the mechanical heating, and/or heat transfer from the reaction zone, a cooling jacket or internal screw cooling arrangement may be used in this section of the extruder/reactor.

In the practice of the instant invention, steam is injected into the reaction zone of the extruder/reactor to effect the heating necessary for hydrolysis. Additional water may also be added with the steam to effect efficient hydrolysis. Temperatures within the reaction zone of the extruder/reactor are consistent with those associated with the concentrated acid hydrolysis system of Dunning et al., '586, column 2, line 46, but far below those associated with the dilute acid hydrolysis twin screw extruder/reactor system investigated by Rugg et al., '747, '748, '671, '079, '375, and '386, supra. In addition to temperature, the effective hydrolysis residence times suggested by Dunning et al., '586, supra, will also be approximated in the instant invention. However, very unlike '586, which includes at least seven separate processing steps, the instant invention employs only one or two operations to effect efficient hydrolysis.

To minimize or preclude the potential backflow of process fluids from the reaction zone to the impregnation zone of a combined extruder/reactor wherein both the reaction zone and the impregnation zone are disposed within a single housing, it is advisable to angle the reactor. In the most preferred operating range of the instant invention, the extruder/reactor is angled from about 4 to 7 degrees off the horizontal. Integrating the mixing and impregnation zones of the extruder/reactor, described in the parent application, with so-called mixed-flow reactors, or as used and described herein "mixed-flow reaction zone," and/or as claimed herein "mixed-flow means" or alternative so-called plug-flow reactor designs or as used and described herein "static-mixing reaction zone," and/or as claimed herein "static-mixing means," both types described in greater detail, infra, as part of our newest discoveries, can eliminate any requirement to angle the mixer/impregnator. By restricting the discharge of the extruder by means of a simple orifice, a continuous plug of reaction mass or as used and claimed herein a "material plug," having the consistency of tar is ejected from the extruder. This plug precludes the possibility of backflow of hot acid from the reaction zone to the impregnation zone—which can dilute the acid in the impregnation zone and diminish the effectiveness of the invention.

When utilizing one set of twin screws to effect mixing, impregnation, and reaction, such as described in the "Description of the Most Preferred Embodiment" of the parent application, backflow of hot process fluids from the reaction zone into the impregnation zone is minimized by the positive displacement of the reaction mass caused by the rotation of the twin screws in the reaction zone. Angling the extruder/reactor, as described, further minimizes the potential for backflow of process fluids. Backflow of process fluid from the reaction zone to the impregnation zone can dilute the acid in the impregnation zone and, thereby, diminishes the effectiveness of the invention. Isolating the reaction zone from the impregnation zone, such as may be the case as described in the "First Alternative to the Most Preferred Embodiment" of the parent application, effectively eliminates the potential of backflow from the reaction zone to the impregnation zone.

When integrating an alternative so-called plug-flow reactor, such as a simple pipe reactor or a pipe reactor fitted with mixing elements, to enhance lateral mixing of the reaction mass, or a so-called mixed-flow reactor with the mixing and impregnation zones described in the "Description of the Most Preferred Embodiment" of the parent application, preventing backflow of process fluid from the reaction zone to the impregnation zone becomes problematic. By eliminating the positive displacement caused by the rotation of the twin screws in the reaction zone, the likelihood that process fluid will tend to backflow into the impregnation zone, even if the extruder/reactor is angled as discussed in the parent application, is greatly increased. Application of a dynamic plug, such as described in Rugg et al., '375, '748, '361, '747, '079, and '386, to prevent backflow is not a viable option since the required plug would be at the terminus of the twin screw arrangement as opposed to an interior section as described therein.

When integrating the mixing and impregnation zones described in the parent application with mixed-flow or alternative plug-flow reaction zones described infra as part of our newest discoveries, a restriction, such as an orifice, can be used to physically isolate the impregnation zone from the reaction zone. The tar-like consistency of the impregnated material passing through the orifice will preclude fluid backflow from the reaction zone. The orifice can be sized to permit a build-up of a material plug in one or more of the terminal flights of the twin screw arrangement in the impregnation zone.

The term "conjugation" or "screw conjugation" as used herein and as understood by those skilled in the art means and is intended to mean the clearance or, as also referred to, the "daylight" that exist between the intermeshing flights of the screws. Therefore, more conjugated screws have less volume between the intermeshing flights. As may be appreciated, screws may have identical channel intermeshing lengths but different degrees of conjugation; a single set of screws can be designed to incorporate this distinction. Although different practitioners in tool and die making arts may have a variety of ways to determine and/or measure screw conjugation, a relatively easy way to understand same, albeit perhaps a bit over-simplified, would be to view a section through both the female and male screw flight in their maximum intermeshing association and subtracting from the measured area of the female flight, measured, of course, across its imaginary base, the equivalent area of the male flight penetrating thereinto.

In the design of the apparatus used in the instant invention, a variety of parameters must be considered for the most efficient operation thereof This is especially true in the design of the impregnation section of the twin screw extruder/reactor. Among these design parameters are the following: single screw diameter, interaxial distance between screws, flight tip width, helix angle, channel depth, channel intermeshing depth, screw length, distance between flight and barrel, screw rotational velocity, and screw pitch length. Of course, certain of the above parameters effect the defined term "conjugation," supra, to wit, particularly the flight tip width and the channel intermeshing depth. Depending upon the amount of material to be fed and the physical characteristics of the feedstock all of these parameters may vary. However, the total induced strain imparted to the reaction mass, especially in the impregnation zone by the twin screws, must be carefully selected for optimum performance. In the design of one aspect of the instant invention, a range of ratios, discussed in more detail infra, relating to the degree of conjugation between the various zones of the extruder/reactor must be adhered to for effecting optimum performance.

Practice of the instant invention through application of the new instant procedures and techniques in combination with the instant new extruder/reactor designs effects efficient operation at significantly higher sugar conversions than when using other types or designs of so-called plug flow reactors, or so-called mixed-flow reactors.

The Four Embodiments: The invention now takes the form of no less than four different embodiments, wherein the first or most preferred relates to the use of a single extruder/reactor in which the mixing, impregnation, and reaction zones are integrated into a single twin screw unit. The second embodiment, or first alternative to the most preferred embodiment, relates to physically dividing the twin screw extruder/reactor into separate units necessitating the use of more than one drive means; division of the individual zones, particularly the reaction zone, is allowed. The third embodiment, or second alternative to the most preferred embodiment, relates to the use of one or more twin screw units to effect acid mixing and impregnation in series with an alternative so-called plug-flow reactor, or as noted supra and used and described herein a "static-mixing reaction zone," and/or as claimed herein "static-mixing means" sans twin screws, to effect hydrolysis. The fourth embodiment, or third alternative to the most preferred embodiment relates to the use of one or more twin screw units to effect acid mixing and impregnation in series with a so-called mixed-flow reactor or as noted supra and used and described herein a "mixed-flow reaction zone," and/or as claimed herein "mixed-flow means," to effect hydrolysis.

OBJECTS OF THE INVENTION

It is therefore a principal object of the present invention to develop substantially improved and efficient commercial-scale systems for converting feedstocks of lignocellulose and concentrated sulfuric acid to fermentable sugars.

Still another principal object of the present invention is to develop substantially improved and efficient commercial-scale systems for converting feedstocks of lignocellulose and concentrated sulfuiric acid to fermentable sugars, and wherein substantially improved and more intensive mixing of such feedstock is effected than has been heretofore attainable.

A further principal object of the present invention is to develop substantially improved and efficient commercial-scale hydrolysis systems for converting feedstocks of lignocellulose and concentrated sulfuric acid to fermentable sugars, and wherein substantially improved and more intensive strain is utilized to effect mixing of such feedstock than has been heretofore attainable, and further wherein such intensified strain is effected by a combination of operating and design factors including screw rotational speed, residence time, and screw configuration.

Another principal object of the present invention is to develop a hydrolysis system of the types, supra, which can easily and effectively be coupled with the acid recovery system comprising the invention of Hester et al., '580, '637, '827, '907, and '693, supra, and as such, provide a combination comprising both an improved hydrolysis, by itself, and also an improved combination of a hydrolysis system, and an energy efficient acid recovery system.

Still a further object of the present invention is to develop several reactor options for converting lignocellulose to fermentable sugars following impregnation with concentrated sulfuric acid wherein it is possible to take advantage of the mixing and impregnation parameters described herein and potentially lower cost reaction means.

Still further and more general objects and advantages of the present invention will appear from the more detailed description set forth in the following disclosure and examples, it being understood, however, that this more detailed description is given by way of illustration and explanation only and not necessarily by way of limitation, since various changes therein may be made by those skilled in the art without departing from the true scope and intent of the instant invention.

BRIEF DESCRIPTION OF THE DRAWINGS

The apparatus used in the practice of the present invention is outwardly similar in appearance but not in design or function to that shown by Rugg et al., '671, particularly FIG. 1, the disclosure and teachings of which are hereby and herein incorporated by reference thereto. It should, of course, be appreciated that internal differences will be better understood from a consideration of the following description taken in connection with the accompanying drawing in which.

DETAILED DESCRIPTION OF THE DRAWING

Figure 6:
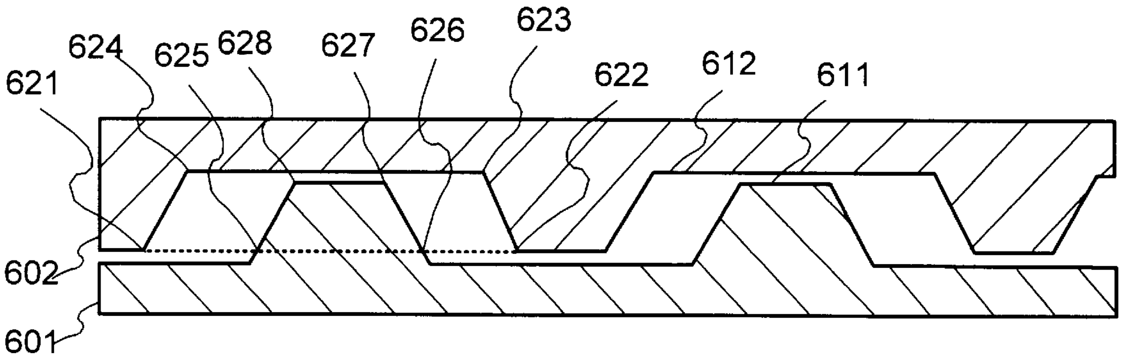
Figure 7:
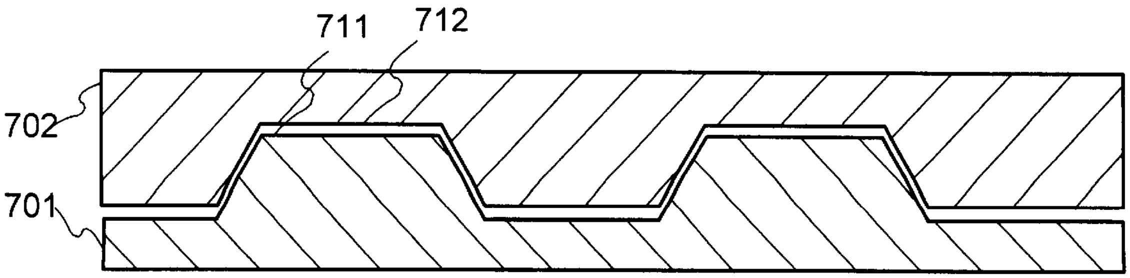
Figure 8:
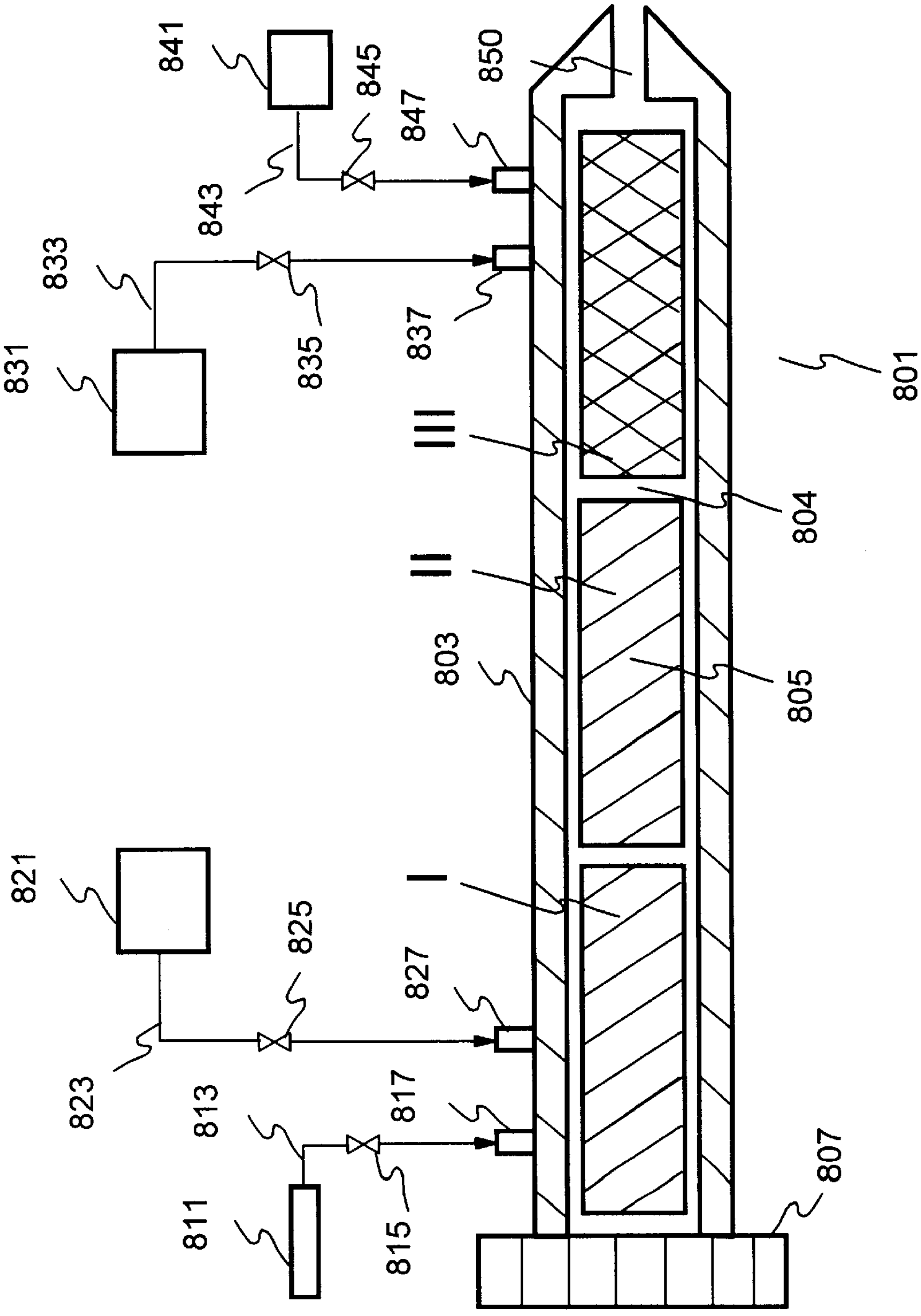
FIG. 8 represents a cross section of an alternative twin screw extruder/reactor arrangement, showing a static-mixing reaction zone in place of the twin screw reaction zone of the type taught to be typical of our invention as set forth in said parent application, 08/549,439, supra
Figure 9:
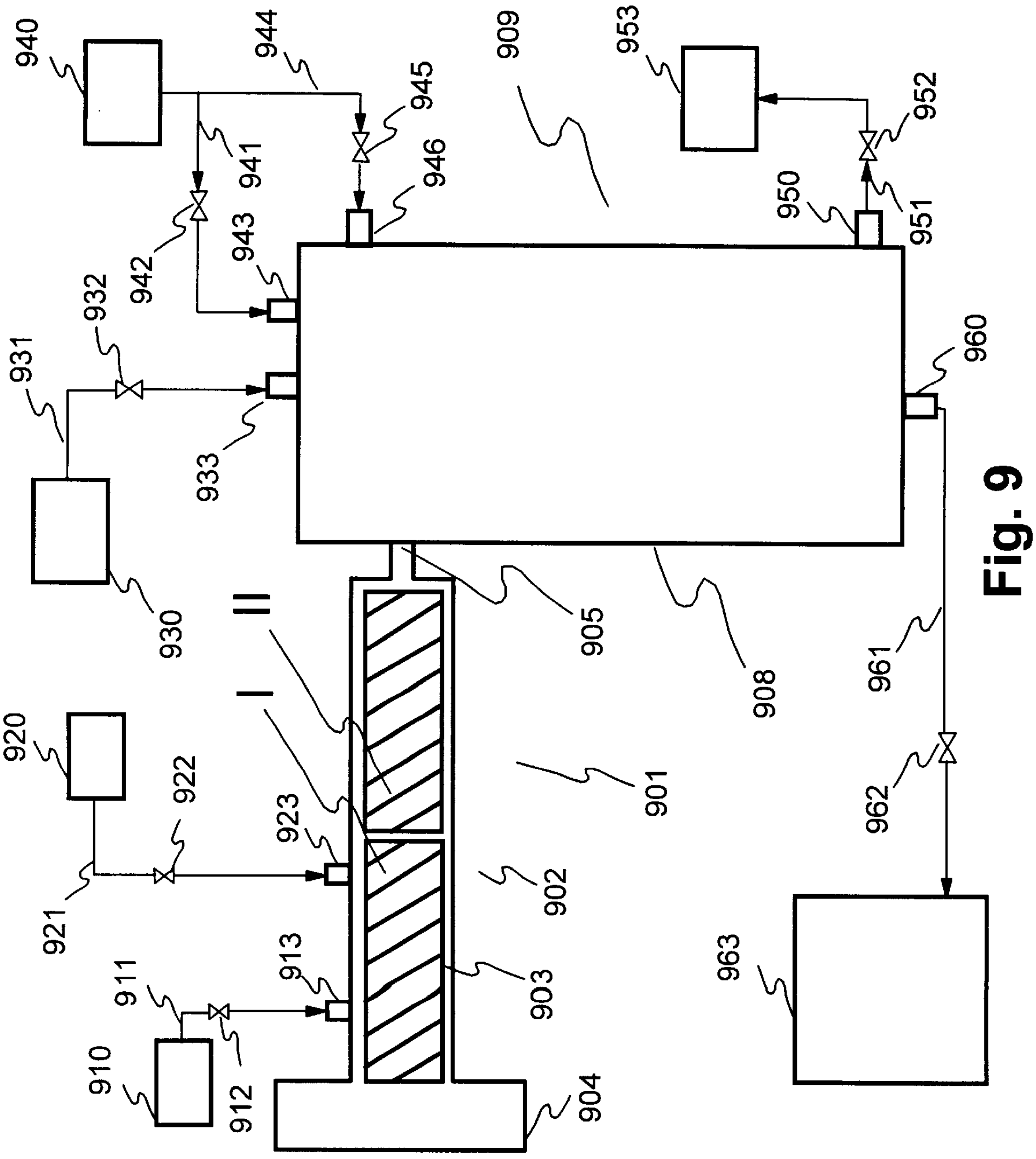
FIG. 9 represents still another extruder reactor arrangement in which two of the zones described in our parent application, i.e., the mixing zone and the impregnation zone, are integrated with a mixed-flow reaction zone.

For the sake of clarity and a better understanding of the applicability of FIGS. 1 to 9, a more detailed description of same is given below, it being understood that FIGS. 1 to 7 represent that part of the instant invention disclosed and taught in our parent application, supra, and that FIGS. 8 and 9 represent that portion of the instant invention discovered and disclosed subsequent thereto.

Figure 1:
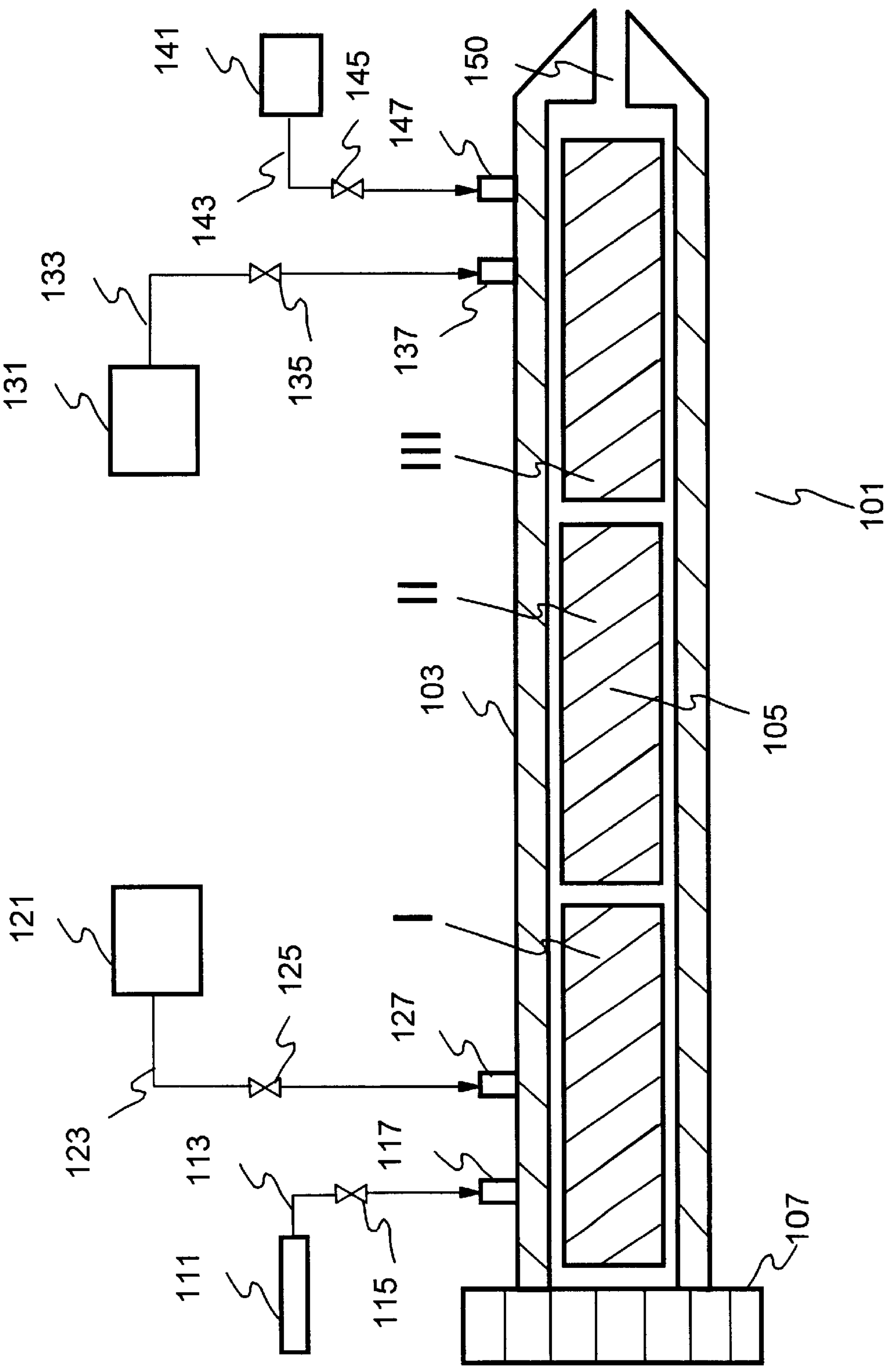
FIG. 1 represents a cross section of the twin screw extruder/reactor arrangement, showing a single screw, used in the practice of the instant invention wherein a single one-step pass therethrough, albeit comprised of three separate processing zones, there is effected the herein described improved conversion of lignocellulosic materials and concentrated sulfuric acid feedstocks to produce heretofore unattainable conversions of fermentable sugars in a single-step process. For convenience and ease of understanding it is suggested that FIG. 1 can be compared to the presentation set forth by to Rugg et al., '375, in FIG. 4 thereof, the disclosure and teachings of which are hereby and herein incorporated by reference thereto.

Referring now specifically to FIG. 1, it will be appreciated that the illustration comprises a cross-sectional, side-elevational view taken along a line, not shown, in a planer view, also not shown, of a twin screw reactor along the axis of one such twin screw. As shown therein, the extruder/reactor is generally shown at 101 and comprises housing 103 containing the co-rotating twin screws, only one of which is shown herein, generally at 105. As illustrated, screw 105 comprises three separate but contiguous processing zones, illustrated at I, II, and III. In the most preferred embodiment of the instant invention, the portion of screw 105 generally representing the helical-shaped flights, although not shown, are trapezoidal cross-sections. Screw 105 may be caused to co-rotate with the other screw, not shown, by any convenient manner and means, such as, by motor and transmission means, illustrated generally at 107.

In operation of extruder/reactor 101, after the twin screws are placed into rotary motion, the cellulosic feedstock, which may be almost entirely cellulose, such as cotton linters, or most often comprised of cellulose, hemicellulose, and lignin from wood fibers and the like from source 111 is fed via line 113 and means for control of flow 115 into inlet port 117. Although means for control of flow 115 is depicted with a symbol representative of a valve, those skilled in this art will readily appreciate that same most likely can be a weigh belt or the like or a conveyor via line 113. Simultaneously therewith, concentrated sulfuric acid from source 121 is fed via line 123 and means for control of flow 125 into inlet port 127. The resulting introduction of the cellulose and concentrated acid through inlet ports 117 and 127, respectively, causes same to be introduced into mixing zone I of extruder/reactor 101. It will be appreciated by those having broad experience in the art of operating twin screw extruders/reactors that the rates of introduction of materials through inlet ports 117 and 127 are adjusted in relation to the rotational speed of the twin screws comprising extruder/reactor 101 to provide, and indeed to ensure, a so-called starved condition whereby only sufficient material necessary for effecting the desired thorough mixing thereof, complemented simultaneously with the conveying downstream through the intermeshing trapezoidal screw flights, is effected. To put it another way, the rates of introduction of input material through inlet ports 117 and 127 in relation to the rotational speed of the twin screws should not be so great as to cause flooding of the materials in the mixing zone whereby, dynamically, there are no substantial voids or discontinuities in many or most of that portion of each flight disposed away from the juxtaposition of screw intermeshing and generally near the inner wall of housing 103. After the material, introduced into zone I, has been most thoroughly mixed so that the concentrated sulfuiric acid and the cellulosic feedstock are substantially homogeneous in respect to one another, such resulting mixed material is conveyed by screw 105 from mixing zone I into impregnation zone II. Also not shown, it will be appreciated from prior discussion that the degree of conjugation in zone II is greater than the degree of conjugation in zone I. The net result is that since the flights in zone II are turning at the same rate as in zone I, the material in zone II will be brought into much more intimate contact and more heavily worked to the extent and degree that the near homogeneous mix of acid and cellulose in zone II is so completely kneaded and worked that the acid, which was on the surface of the individual cellulose particles, fibers and the like, is caused to impregnate substantially all of same.

Subsequently, the resulting impregnated material is further conveyed down screw 105 and introduced into reaction zone III. Simultaneously therewith, supplementary heat which may be required for optimum operation in zone III may be introduced into zone III in any of a number of convenient ways. For example, steam from source 131 may be introduced through line 133 and means for control of flow 135 into inlet port 137 and/or hot water from source 141 may be introduced via line 143 and means for control of flow 145 into inlet port 147. In the most preferred embodiment for operation of the instant invention, mixing zone I may be operated at a temperature in the range of about 30° C. to about 40° C.; impregnating zone II may be operated in the temperature range of about 35° C. to about 45° C. On the other hand, in the most preferred embodiment for operation of the instant invention, reaction zone III would be operated so that the material therein is maintained at a temperature in the range of about 120° C. to about 135° C. Accordingly, it will be appreciated that if a temperature profile were plotted such that the X axis correlates with composite lengths of zones I, II, and III the resulting temperature profile starting at X=O would generally be expected to be a straight line function through zone I and a portion of zone II and thereafter would rise until it reached a point on the Y axis at the transition between zone II and zone III substantially representing the higher temperature maintained in zone III, albeit, in most modes of operation the temperature profile in zone III, depending on the relative locations of inlet ports 137 and 147, the length of zone III, and the speed of rotation of screw 105, will cause a temperature profile which can be represented by an upward slope at said transition between zone II and zone III and thereafter along the X axis, represented through the length of zone III by a gradual flattening of said slope. Because of the substantial mechanical mixing, the resulting heat generated therebetween can also cause a somewhat rising temperature profile in impregnation zone II, i.e., an upward break in the line when compared with the substantially horizontal profile in mixing zone I, and because of the probability of small changes in temperatures existing throughout the length of reaction zone III, the descriptions herein and claims relating thereto are couched in terms of mean temperatures. Such mean temperature may be detected or calculated by any number of convenient means, such as, by locating a plurality of thermocouples, not shown, in the inner wall of housing 103 wherein, perhaps, only one or two may be required for temperature readings in mixing zone I, several more may be required for obtaining temperature readings in impregnation zone II with the larger portion thereof preferably positioned in the downstream portion of impregnation zone II and the upstream portion of reaction zone III to better effect close bracketing of temperatures through areas having the steepest slopes in the overall temperature profile.

Also not shown, it will be appreciated that cooling or heating means other than the introduction of mechanical mixing in zone II and the introduction of steam or superheated hot water in zone III may be utilized. For instance, hot oil might conveniently be pumped through the innards of that portion of the screw comprising the reaction zone. Likewise, cooling media might be circulated through the innards of that portion of the screw comprising either the impregnation zone or, if desired, through both the impregnation zone and the mixing zone. It will also be appreciated that if steam is injected through inlet port 137, as shown, that unless plugging means are provided, the temperature rise effected in reaction zone III will not be expected to rise appreciably above about 100° C., since most of the steam will be caused to condense therein or exit through the discharge orifice. In instances wherein the use of a discharge plug is deemed desirable, the discharge of said materials introduced through outlet port 150 may be restricted to effect flooding and pile-up within the flights at the end of reaction zone III. The resulting induced flooding, along with the high degree of conjugation, and length of tortuous path in this section can effect sufficient pressure rise above ambient therein, whereby the steam injected through inlet port 137 effects a raise of the temperature of the material in reaction zone III to the degree desired. It should also further be appreciated that, although also not shown, extruder/reactor 101 may preferably be inclined from the horizontal such that the discharge end thereof, including discharge orifice 150, is at a lower elevation than the end juxtaposed inlet ports 117 and 127. It has also been suggested that the angle of inclination for such an extruder/reactor may be upwards to about 10 degrees from the horizontal, whereby the water of condensation formed from steam injected into inlet port 137 is caused to remain in the general vicinity of zone III and preferably at, or near the lower end thereof, and away from the material in impregnation zone II so as not to cause dilution of the acid during the impregnating process therein conducted.

Material which has been processed through reaction zone III is subsequently discharged from the end thereof through one or more discharge orifices, one of which, as noted above, is conveniently shown at 150. Although not directly related to the specific methods and means taught and claimed herein, it will be appreciated by those skilled in the art that such resulting material, i.e., an acid-sugar hydrolyzate, may subsequently be introduced to separation means wherefrom the resulting separated sugar portion may later be fermented to produce ethanol.

Figure 2:
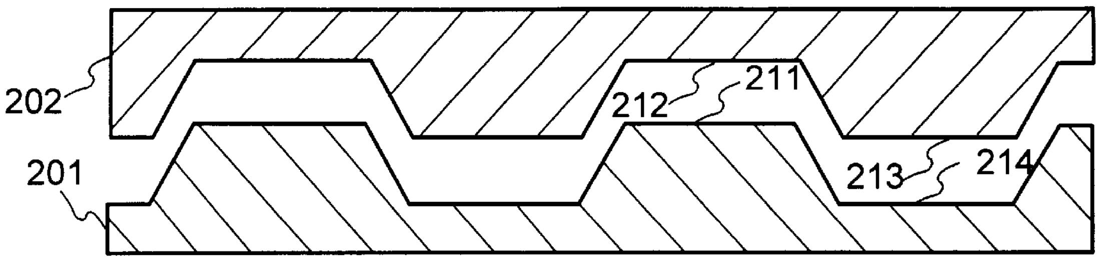
FIGS. 2 to 7 are partial schematics shown in section of two different types of screw conjugations, i.e., FIGS. 2 to 4 and FIGS. 5 to 7, and within each set thereof further illustrating different degrees of conjugation.
Figure 3:
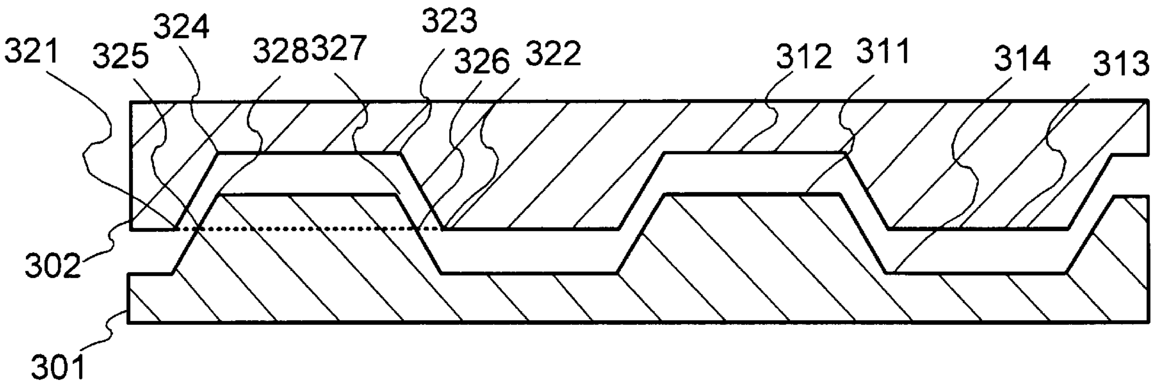
Figure 4:
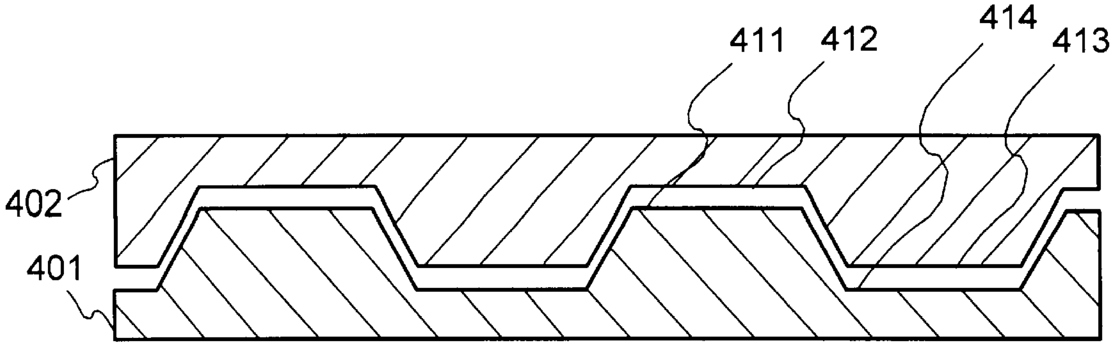

Referring now more specifically to FIGS. 2, 3, and 4 therein are shown partial schematics, albeit, in a simplified form of one manner and means of representing screw conjugation wherein either the distance between the axis of each twin screw shaft is varied or the diameter of the screw flights are varied or both. In these schematics, the viewing is planer at a section taken along a line in the plane defined by the axis of each twin screw when the twin screws are horizontally disposed. Comparing the representations given in FIGS. 2, 3, and 4, it should be readily apparent that the channel inter-meshing depth represented in FIG. 2 is relatively small compared to that shown in FIGS. 3 and 4, respectively. Screw conjugation, in the arrangement shown in FIG. 2, is in the neighborhood of perhaps 10 to 20 percent, whereas in FIG. 3 it is nearly 50 percent and in FIG. 4 approaching 100 percent, i.e., perhaps 90 to 95 percent. These degrees of conjugation can be more accurately determined or measured when the definition given, supra, for screw conjugation is utilized. Thus, for instance, referring still more specifically to FIG. 3, the degree of intermeshing between the left-most flight tip on 301 into the respective channel of screw 302 and the resulting degree of screw conjugation can be determined simply by drawing an imaginary line represented by points 321 and 322 at the location indicated and subtracting from the area determined by the polygon represented by points 321, 322, 323, and 324, the area of the flight tip penetrating thereinto which is represented by the polygon defined by points 325, 326, 327, and 328.

Figure 5:
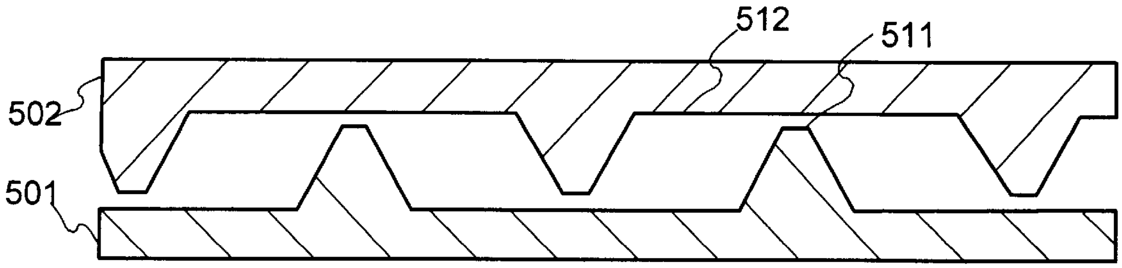

Referring now more specifically to FIGS. 5, 6, and 7, therein is shown in section taken along the same or similar line referenced in the discussion of FIGS. 2, 3, and 4, supra, partial schematics of portions of three sets of twin screw reactor in the vicinity of intermeshing between flight tips and channel troughs wherein neither the center lines of the shafts of each screw are moved closer together or further apart or wherein the diameter of neither twin screw needs to be varied. In the particular embodiment illustrated, the flight tip widths on the screws are varied to effect different degrees of conjugation. In this particular setup, the tooling and machining performed on what is represented as portions of screw sets 501/502, 601/602, and 701/702 resulted from lesser amounts being cut away to effect greater flight tip widths, respectively, so that the resulting screw conjugation in the depiction marked FIG. 5 may be in the neighborhood of perhaps 20 percent, for FIG. 6 in the neighborhood of about 50 percent, and for FIG. 7 upwards between about 90 and 95 percent. Again, as taught in the discussions of FIGS. 2, 3, and 4, supra, a more accurate measure of the degree of screw conjugation can be easily determined by referring to, for example, FIG. 6 wherein the area defined by the polygon formed by points 621, 622, 623, and 624 represents the trough area and the degree of intermneshing with the respective and opposing screw flight is defined by the polygon representing points 625, 626, 627, and 628.

Although apparent to those skilled in the art, for those readers who are not that well acquainted with the above described section depictions of sets of twin screws, the particular sections illustrated are understood to be the maximum screw conjugation which can be effected and that if different horizontal slices or sections were viewed either at higher or lower elevations, the screw tips would be seen to be in less intermeshing engagement with the respective complementary troughs.

Referring now specifically to FIG. 8, the illustration depicts a cross-sectional, side-elevational view taken along a line, not shown, in a planer view, also not shown, of a twin screw extruder along the axis of one such twin screw and integral with a static-mixing reaction zone and disposed generally upstream thereof.

As noted supra, in contrast to the reaction zone describe in the "Description of the Most Preferred Embodiment" of the parent application, the reaction zone of the instant alternative can be effectively isolated from the mixing and impregnation zones through the use of a simple orifice. Isolating the reaction zone from the impregnation zone precludes the possibility of backflow of process fluid from the reaction zone into the impregnation zone. Backflow of process fluid from the reaction zone to the impregnation zone can dilute the acid in the impregnation zone and, thereby, diminishes the effectiveness of the invention. Application of a dynamic plug, such as described in Rugg et. al., '375, '748, '361, '747, '079, and '386, to prevent backflow of process fluid from the reaction zone to the impregnation zone is not a viable option. Since the required dynamic plug would be at the terminus of the twin screw arrangement as opposed to an interior section as described by Rugg et al., it is doubtful that an effective plug could be formed.

As shown, in FIG. 8, the twin screw extruder/static-mixing reaction zone (TSE/SMR) is generally shown at 801 and comprises housing 803 containing co-rotating twin screws, only one of which is shown herein generally at 805. As illustrated, screw 805 comprises two separate but contiguous processing zones, illustrated at I and II. In the most preferred mode of this relatively new embodiment of the instant invention, the portion of screw 805 generally representing the helical-shaped flights, although not shown, are trapezoidal cross-sections. Screw 805 may be caused to co-rotate with the other screw, not shown, by any convenient manner and means, such as, by motor and transmission means, illustrated generally at 807.

In operation of TSE/SMR 801 the cellulosic feedstock of the type described, for example, in the discussion of FIG. 1, supra, from source 811 is introduced into TSE/SMR 801 via line 813 through inlet port 817. Although means for control of flow 815 is depicted with a symbol representative of a valve, those skilled in the art will readily appreciate that same could otherwise be a weigh belt or the like or a conveyor line. Simultaneously therewith, concentrated sulfuric acid from source 821 is fed via line 823 and means for control of flow 825 into either inlet port 817 or more preferably, into separate inlet port 827. The resulting introduction of the cellulosic feedstock and concentrated sulfuiric acid through inlet ports 817 and 827, respectively, causes same to be introduced into mixing zone I of TSE/SMR 801. The rates of introduction of material through inlet ports 817 and 827 are adjusted in relation to the rotational speed of the twin screws disposed in zones I and II of TSE/SMR 801 to provide for the so-called starved condition described, supra. After the material, which is introduced into zone I has been most thoroughly mixed so that concentrated sulfiuic acid and the cellulosic feedstock are substantially homogeneous in respect to one another, such resulting mixed material is conveyed by screw 805 from mixing zone I into impregnation zone II. Also, although not shown, it will be appreciated from review of our earlier work that the degree of conjugation in zone II is greater than the degree of conjugation in zone I which effects in zone II a greater shearing of the material therein to effect substantially more reduction of the particle size together with more efficient kneading of the material to thereby cause the acid to more fully impregnate the cellulosic structure.

Subsequently, the material is conveyed through an aperture, such as an orifice, not detailed but generally shown at 804, into static-mixing reaction zone III (as noted, supra), said orifice 804 having a cross-sectional area which is substantially less than represented by the internal cross-sectional area of housing 803. The acid impregnated feedstock from impregnation zone II forms a viscous paste which, when extruded through said orifice 804 forms a material plug that precludes backflow of material from reaction zone III to impregnation zone II and thereby eliminates the need to angle the instant extruder/reactor off of the horizontal. Simultaneously with the introduction of the acid impregnated feedstock from impregnation zone II, supplementary heat, which may be required for optimum effecting of the desired degree of reaction in zone III may be introduced into zone III in any of a number of convenient ways. For example, steam from source 831 may be introduced through line 833 and means for control of flow 835 into inlet port 837 and/or hot water may be added from source 841 via line 843 and means for control of flow 845 into inlet port 847. Unlike the reaction zone shown in our earlier work and depicted in FIG. 1, supra, the reaction zone depicted herein as zone III may comprise a series of mixing elements, such as those of the type manufactured by the Koch Engineering Company, Inc. Note: Any reference made herein to materials and/or apparatus which are identified by means of trademarks, trade names, etc., are included solely for the convenience of the reader and are not intended as, or to be construed, as an endorsement of said materials and/or apparatus. Said static-mixing reaction zone of the type comprising a hollow cylinder, such as a pipe, complete with mixing elements to enhance lateral mixing of the reaction mass at lower flow rates. Mixing elements can, therefore, be employed to replace long sections of smaller diameter pipe, used to effect higher flow rates and greater turbulence at any given mass throughput, with relatively less expensive shorter sections of larger diameter pipe. Although depicted with mixing elements, it will be appreciated by those skilled in the art that a reduction of the reaction zone cross-sectional area can produce higher reaction mass flow velocities to thereby effect greater turbulence and negate the need for mixing elements. Therefore, FIG. 8 depicts what is considered to be the most cost effective alternative to the twin screw reaction zone arrangement of the parent application. However, any so-called plug-flow reactor design can be used as part of the instant invention. In addition to better mixing, the use of mixing elements may provide for better heat transfer into the reaction mass at lower flow rates, especially when heat is transferred through the walls of the reaction zone, such as would be the case when utilizing a heating jacket around the reaction zone. It is noted that the operating temperatures set forth for operation of the embodiment of the instant invention depicted in FIG. 1 may also be utilized in operation of our new alternative embodiment herein depicted in FIG. 8.

Although not shown, it will be further appreciated that cooling or heating means other than the introduction of mechanical heating in zone II and the introduction of steam or superheated hot water in zone III may be utilized. For instance, cooling media might conveniently be pumped through the innards of that portion of the screw comprising either the mixing zone or, if desired, through both mixing zone I and impregnation zone II. Additionally, steam or hot oil may be introduced into a jacket or heating panel surrounding static-mixing reaction zone III. It may be appreciated that if steam is injected through inlet port 837, that unless plugging means are provided, the temperature rise effected in reaction zone III will not be expected to rise appreciably above 100° C. since most of the steam will be caused to condense therein or exit through the discharge orifice. In instances wherein the use of a discharge plug is deemed desirable, the discharge of said materials introduced through outlet port 850 may be restricted by any convenient means, such as an orifice or with an orifice of variable geometry.

Material which has been processed through static-mixing reaction zone III is discharged from the end thereof through one or more of such small diameter discharge orifices, one of which is shown at 850. Although not directly related to the specific methods and means taught and claimed herein, it will be appreciated by those skilled in the art that such resulting material, i.e. an acid-sugar hydrolyzate, may subsequently be introduced to separation means wherefrom the resulting separated sugar portion may later be fermented to produce ethanol.

Referring now specifically to FIG. 9, the illustration shows a cross-sectional, side-elevational view taken along a line, not shown, in a planer view, also not shown, of a twin screw extruder integral with a mixed-flow reaction zone along the axis of one such twin screw/reactor. As may be seen, said twin screw extruder, generally shown at 901, comprises two zones, i.e., mixing zone I and impregnation zone II, preferably of the type described in our earlier work and depicted in FIG. 1, supra, wherein said zones I and II are arranged to be integral with a mixed-flow reaction zone, generally shown at 909. As shown therein, twin screw extruder 901 comprises housing 902 containing the co-rotating twin screws, only one of which is shown herein generally at 903. As illustrated, screw 903 comprises two separate but contiguous processing zones, illustrated at I and II. The mixed-flow reaction zone, which is generally shown at 909, comprises housing 908 containing any or several mixing means, such as, for example, an impeller and impeller shaft, not shown. In the most preferred form of this relatively new embodiment of instant invention, the portion of screw 903 generally representing the helical-shaped flights, although not shown, are trapezoidal cross-sections. Screw 903 may be caused to co-rotate with the other screw, not shown, by any convenient manner and means, such as, by motor and transmission means, illustrated generally at 904.

In operation of this two-zone, twin-screw extruder/mixed-flow reaction zone combination, the cellulosic feedstock (of the type described, for example, in the discussion of FIG. 1) from source 910 is fed via line 911 and means for control of flow 912 into inlet port 913. Although means for control of flow 912 is depicted with a symbol representative of a valve, those skilled in the art will readily appreciate that same most likely can be a weigh belt or the like or a conveyor line. Simultaneously therewith, concentrated sulfuric acid from source 920 is fed via line 921 and means for control of flow 922 into either inlet port 913 or more preferably, into separate inlet port 923. The resulting introduction of the cellulosic feedstock and concentrated sulfuric acid through inlet ports 913 and 923, respectively, causes same to be introduced into mixing zone I of the twin screw extruder 901. The rates of introduction of material through inlet ports 913 and 923 are adjusted in relation to the rotational speed of the twin screws of zones I and II to provide for the so-called starved condition, supra. After the material, introduced into zone I, has been most thoroughly mixed so that concentrated sulfuric acid and the cellulosic feedstock are substantially homogeneous in respect to one another, such resulting mixed material is conveyed by screw 903 from mixing zone I into impregnation zone II. Also not shown, it will be appreciated from prior discussion that the degree of conjugation in zone II is greater than the degree of conjugation of zone I which effects a greater shearing and a resulting greater particulate size reduction together with more efficient kneading of the material in zone II, thereby causing the acid to more fully impregnate the cellulosic structure.

Subsequently, the resulting impregnated material in zone II is removed therefrom and conveyed through an aperture, such as an orifice, of restricted size as described in the discussion of FIG. 8, supra, and herein shown as orifice 905 wherefrom it is introduced into mixed-flow reaction zone 909. The resulting acid impregnated material effected in impregnation zone II has been found to form a paste which, when extruded through orifice 905 produces a material plug which precludes backflow of process fluid from the mixed-flow reaction zone 909 to impregnation zone II. Backflow of process fluid from the reaction zone to the impregnation zone can dilute the acid in the impregnation zone and, thereby, diminishes the effectiveness of the invention. Application of a dynamic plug, such as described in Rugg et al., ’375, ’748, ’361, ’747, ’079, and ’386, to prevent backflow of process fluid from the reaction zone to the impregnation zone is not a viable option. Since the required dynamic plug would be at the terminus of the twin screw arrangement as opposed to an interior section as described by Rugg et al., it is doubtful that an effective dynamic plug could be formed. Simultaneously with the introduction into mixed-flow reaction zone 909 of the acid impregnated material removed from impregnation zone II, supplementary heat, which may be required to effect the optimum degree of reaction resulting in mixed-flow reaction zone 909, may be introduced thereto in any of a number of convenient ways. For example, hot water from source 930 may be introduced through line 931 and means for control 932 into inlet port 933 and/or steam from source 940 via line 941 and means for control 942 into inlet port 943. Additionally, steam from source 940 may be introduced into a heating jacket, not shown, surrounding mixed-flow reaction zone 909 via line 944 and means for control 945 into inlet port 946. Condensate from the jacket, not shown, may be discharged to collector 953 via discharge port 950 via line 951 and flow control means 952. Although means for control of flow 952 is depicted with a symbol representative of a valve, those skilled in the art will readily appreciate that same most likely can be a steam trap of some sort, such as the so-called bucket trap. Unlike the reaction zone associated with our earlier work as depicted in FIG. 1, supra, the mixed-flow reaction zone depicted herein as 909 may comprise a vessel, possibly but not necessarily including mixing baffles, not shown, and an impeller and shaft assembly, also not shown. Since particulate suspension is critical within the mixed-flow reaction zone, it will be appreciated by those skill in the art that the impeller selected for mixing be of the type commonly referred to as axial flow. So-called axial flow impellers have a principal direction of discharge that is normal to the axis location. Proper selection of power numbers, discussed in more detail infra, is also of great importance. Depending upon the impeller selected and the configuration of the reaction zone, it being understood that practitioners may be required to use any of a number of configurations, a guide is included and a reference cited, infra, to aid in proper impeller power number selection. Additionally, and as will be discussed in more detail, infra, the size of a so-called mixed-flow reactor is larger than that of an equivalent so-called plug-flow reactor for the same duty. As also previously noted in the discussion of FIG. 8, supra, the same or similar operating temperatures set forth in the discussion of FIG. 1, may be used in this new alternative embodiment. The viscous nature of the resulting acid impregnated material extruded from orifice 905 will limit or preclude backflow of heated material from the mixed-flow reaction zone 909 to impregnation zone II and, thereby, reduce or eliminate the need to angle extruder 901 off of the horizontal.

The hydrolyzed material from mixed-flow reaction zone 909 is discharged through discharge port 960 via line 961 and flow control means 962 to collection source 963. Although not directly related to the specific methods and means taught and claimed herein, it will be appreciated by those skilled in the art that such resulting material, i.e., an acid-sugar hydrolyzate, may subsequently be introduced to separation means wherefrom the resulting separated sugar portion may later be fermented to produce ethanol.

For the sake of clarity and ease of understanding by the reader, in addition to the detailed description of FIGS. 1 to 9, supra, the applicability of FIGS. 2 to 7 is given infra in the section entitled "Description of the Second Embodiment First Alternative to the Most Preferred Embodiment."

DESCRIPTION OF THE MOST PREFERRED EMBODIMENT

In accordance with the teachings of the present invention, hemicellulose and cellulose can be efficiently converted to pentose and hexose sugars through a procedure using concentrated sulfuric acid and the instant, specially designed twin screw extruder/reactor which sequentially and simultaneously effects a distributive mixing step, followed by an impregnation step, and thereafter followed by a reaction (hydrolysis) step. A principal embodiment of the instant invention utilizes separate zones within the extruder/reactor to effect acid mixing, impregnation, and hydrolysis. In this new and improved arrangement and technique there is no requirement for separate hemicellulose hydrolysis, dewatering, drying, grinding, and acid mixing steps previously used in the prior art which seems to represent most efficient concentrated acid hydrolysis systems, to wit, Dunning et al., supra. Furthermore, practice of the instant invention eliminates the need for the high temperatures and subsequent very short residence times used in dilute acid systems utilizing twin screw reactors, as shown in Rugg et al., and decreases sugar degradation and markedly increases potential glucose conversion.

In the practice of the most preferred embodiment of the instant invention, a single twin screw extruder/reactor is used, albeit, in a first alternative preferred embodiment of the instant invention, more than one and preferably three twin screw units may be used. In the preferred embodiment, the extruder/reactor is comprised of three primary zones: mixing, impregnation, and reaction. In the design of twin screw extruder/reactor systems of the type herein disclosed, a variety of design parameters must be defined whether or not the design employs a single set of twin screws along which are defined zones such as mixing, impregnation, and reaction or whether a number of separate or twin screws are used in either separate or common housing. For ease of understanding, these parameters are listed below:

$D$=single screw diameter—inches
$D_r$=single screw root diameter—inches
$D_e$=equivalent diameter—inches
$L$=screw length—inches
$E$=flight tip width—inches
$h_i$=channel intermeshing depth—inches
$h$=channel depth—inches
$N$=screw rotational velocity—RPM
$t$=screw pitch length—inches
$\Delta P$=internal fluid pressure—psi
$\phi$=helix angle—degrees
$\delta$=distance between flight and barrel—inches
$\eta$=fluid viscosity—poise
$\theta$=average residence time—minutes
$Z$=distance between flights measured at flight base—inches
$\gamma$=total strain
$P$=Petrusek number As may be appreciated, the degree of conjugation is a measure of the void volume that exists between the intermeshed screws. The screws of a twin screw extruder/reactor would be considered to be fully intermeshed when $h_i/h=1$. The helix angle is usually a calculated dimension and is given by the following equation $$\phi=\operatorname{atan}(t/\pi D)360/2\pi$$

The equivalent diameter is defined by the equation $$D_e=\frac{2\pi D-4\sqrt{dh_i}}{\pi}$$

The total strain introduced into the reactants can be defined by the equation $$\gamma=\frac{\pi D_e N\theta}{h_i}$$

For a more detailed explanation of strain, see, for example, McKelvey, James, *Polymer Processing*, John Wiley and Sons, 1962. The fluid pressure is maintained by the back pressure developed by the extruder/reactor's discharge orifice. Unlike the twin screw reactor used by Rugg et al., the significantly lower operating pressures associated with the instant invention do not require or necessitate the use of a dynamic plug in the reactor to prevent backflow from the reaction zone to the impregnation and mixing zones. As may be appreciated by those skilled in the art, most of the design parameters of the extruder/reactor will be dictated by the physical characteristics of the feedstock and the flow rate. For example, the size of the individual screws is determined by the feed flow rate and the physical characteristics of the feedstock.

Mixing Zone: In the mixing zone a concentrated acid solution is injected onto the entering feedstock at a predetermined quantity depending upon the rate of feedstock addition and moisture level of the feedstock. The design parameters of this section of the twin screw configuration are such that thorough distributive mixing and mingling of the acid and feedstock is assured. Acid loading is such as to ensure total wetting of the feedstock prior to entering the impregnation section of the extruder/reactor. When operating in conjunction with an acid recovery system such as described in Hester et al., '580, '637, '827, '907, and '693, supra, a sulfuric acid concentration of approximately 50 to 57 percent and an acid loading of 0.5 to 0.8 pounds of acid per pound of dry feedstock is most preferred. In this section of the extruder/reactor, the screws should be 50 to 70 percent conjugated and have a 0.95 to 0.99 degree of intermeshing. The degree of screw intermeshing will remain substantially the same in all three zones. In the application of the instant invention, for screws wherein D ranges from about 2 to about 12 inches, the screw rotational velocity should be between 70 and 100 RPM. To prevent overheating of the reaction mass caused by the heat of dilution of the acid, mechanical heating, and/or heat conducted from the impregnation and reaction zones, a cooling jacket may be used on this section of the extruder/reactor. As noted infra, internal cooling of the screws can also be employed in this section to preclude overheating of the reaction mass. The mean temperature associated with the mixing zone of the reactor will range between about 20° C. and about 50° C. and most preferably between about 30° C. and about 40° C. Since the mixing zone is separated from the reaction zone, the temperature across this zone of the extruder/reactor should remain essentially constant. As noted supra, the twin screw extruder/reactor will be starve fed. No significant compaction of the feedstock will take place in the mixing, impregnation, or reaction zones of the extruder/reactor; therefore, no compression pressure will be required, unlike Dunning et al., '586, supra.

Impregnation Zone: Within the impregnation section of the extruder/reactor the acid is driven into the lignocellulosic structure of the feedstock. The design elements of this section of the extruder/reactor are such as to assure a high total strain into the reactants. In this zone of the extruder/reactor, the degree of conjugation of the screws is increased from the 50 to 70 percent, found in the mixing zone, to 60 to 80 percent. Unlike the impregnator used by Dunning et al., '586, there exists no requirement for compression pressure to impregnate the lignocellulosic feedstock. The increased conjugation provides for the intensive mixing required to drive the acid into the lignocellulosic structure. The high shear associated with this section of the extruder/reactor may result in a substantial amount of mechanical heating. In addition, since the impregnation zone adjoins the higher temperature reaction zone, it is anticipated that the temperature of the reaction mass at the discharge of the impregnation zone will be higher than that at the inlet. This temperature difference results when some of the heat injected into the reaction zone migrates backward into the incoming reaction mass. Because the reaction temperatures and pressures associated with the instant invention are low as compared to those associated with the process of Rugg et al., '375, '671, '747, '748, '079, and '386, supra, there exists no need to form a dynamic seal to isolate the reaction zone from the impregnation zone. Instead, the forward movement of material into the reaction zone will preclude any significant backflow of heat into the impregnation zone. Therefore, instead of a sharply defined temperature difference between the impregnation and reaction zones, the temperature of the reaction mass will rise substantially, perhaps in the last fourth or perhaps less of the impregnation zone. To preclude premature depolymerization of the hemicellulose and cellulose present in the feedstock, cooling of this section of the extruder/reactor may be necessary. To effect this cooling, a cooling jacket may be used and, as with the mixing zone, the screws may be cooled internally. To further minimize zone to zone heat transfer, insulating spacers may be used, and the extruder/reactor may be angled from the horizontal. By placing the extruder/reactor at an angle off the horizontal, it is possible to minimize the backflow of hot fluid from the reaction zone into the impregnation zone.

Reaction Zone: Relatively low temperature steam is injected into the reaction section of the extruder/reactor to effect the heating necessary for hydrolysis. Additional water may also be added to effect efficient hydrolysis. Temperatures within the reaction zone of the extruder/reactor are consistent with those associated with concentrated acid hydrolysis described by Dunning et al., '586, column 2, lines 45–46, and far below those associated with the dilute acid hydrolysis twin screw reactor system investigated by Rugg et al., '747, column 6, lines 9–10; '079, column 6, lines 12–13; '748, column 5, lines 58–59; '671, column 5, lines 60–61; and '375 and '386, column 6, lines 63–64. In addition to temperature, the effective hydrolysis residence times suggested by Dunning et al., '586, column 2, line 49, will also be approximated in the instant invention. In the reaction zone, the temperatures and pressures therein will correspond to those of saturated steam.

The continuing degradation of the feedstock's physical integrity necessitates the need for a higher degree of conjugation of the screws in the reaction zone of the extruder/reactor. For example, 70 to 90 percent conjugation of the screws in the reaction zone is preferable as compared with 60 to 80 percent in the impregnation zone and 50 to 70 percent in the mixing zone. The higher degree of conjugation also provides for more efficient pumping in this zone. Discharge from the reaction zone of the extruder/reactor will be through an orifice sized to provide for the required reaction zone backpressure. As may be appreciated by those skilled in the art, flooding of the screw flights must occur at the discharge of the reaction zone when operating at reaction zone temperatures above about 100° C. and pressures above ambient.

To achieve optimum hydrolysis performance from the extruder/reactor comprising one aspect of the instant invention and given the same speed of rotation of the screw throughout the length of the extruder/reactor, it is important to ensure that the ratios of conjugation and therefore the ratios of shear energy imputed to, or strain effected on, the material between the three zones of the extruder/reactor are within certain specified ranges. Operating outside these ranges may lead to less than optimum hydrolysis performance of the system, excessive wear, or pluggage of the apparatus. As may be appreciated by an inspection of the invention parameters, infra, considerable overlap exists between the screw conjugation associated with the three zones of the instant invention. Depending upon the degree of conjugation selected for the mixing zone of the extruder/reactor, a ratio of screw conjugation of the twin screw extruder/reactor in said impregnation zone and said mixing zone, respectively, ranging from 1.125 to 1.250 can be selected to determine the optimum conjugation for the impregnation zone of the extruder/reactor. That is, the ratio of screw conjugation (impregnation zone)/screw conjugation (mixing zone) ranges between 1.125 and 1.250. Similarly, the ratio of screw conjugation between the reaction zone and the impregnation zones can range between 1.056 and 1.200. As may be appreciated, in the application of these ratios the degree of screw conjugation can not exceed those levels specified in the invention parameters, infra. It will be further appreciated, that given a common speed of rotation, these ratios of screw conjugation are fixed by the geometry effected in the tooling thereof.

In the fabrication of the extruder/reactor, comprising one aspect of the instant invention, it is preferable to employ a computerized numerical control (also known as a CNC) milling machine to "cut" the screws and a wire electrical discharge machine (also know as an EDM) to cut the barrel for the screws. Although other devices may be employed, these state-of-the-art fabrication tools, in the hands of a skilled user, offer the best possibility to achieve the close tolerances associated with the design of this type apparatus. Although it is possible to fabricate one long screw, even if tapered, it may be more desirable to fabricate individual sections (tapered if desired) to fit on to a keyway shaft. Although not a requirement, the individual section can, if desired, be separated by transition pieces milled to conform to the design of the screw sections. Should tapered screws be desired, the barrel can be cut precisely to accommodate the screws by simply angling the rod from which the barrel is cut in relation to the wire EDM. As with the screws, it is also possible to fabricate the barrel in sections and connect the individual sections together by welding or through the use of tie rods or flanges.

DESCRIPTION OF THE SECOND EMBODIMENT FIRST ALTERNATIVE TO THE MOST PREFERRED EMBODIMENT

As may be appreciated by those skilled in the art, in teaching the practice of the instant invention, it was most convenient to assume a single twin screw driven by a single drive means. However, limitations associated with fabrication capability and the extruder/reactor drive means, may necessitate physically dividing the extruder/reactor into its various zones: mixing, impregnation, and reaction. It is generally accepted by those skilled in the art that the practical maximum extruder/reactor length is normally about 40 times the single screw diameter. Still further, and especially in the case of the reaction zone, it may be necessary to subdivide the individual zones. As may be appreciated, in physically dividing the extruder/reactor, each section divided thereinto would have its own drive means. Although conformance with the design elements of the extruder/reactor as taught, infra, is recommended, i.e., screw conjugation, screw conjugation ratios, and a fixed screw rotational speed, it may be decided to alter some aspect of the screw design or rotation speed. More particularly, such altering is oftentimes dictated by commercial considerations, ease of applying conventional tooling techniques, and utilization of splining techniques, wherein the central core of the drive shaft for each single screw comprising a twin set of screw reactors can be utilized without having to adjust the distance between their center lines or axis and yet different portions or zones along the length of said drive shafts can be fitted with matching and intermeshing screw flights having different or interchangeable conjugation.

As was taught earlier in the brief description of FIGS. 2, 3, and 4 the type of conjugation generally effected thereby either requires adjustment of the distance between twin shaft center lines to thereby vary the channel intermeshing depth or if the center lines distance is to remain constant, requires that the shafts are keyed or splined so that complementary screw flights of different diameters can be fixed thereon. As those skilled in the art of manufacturing this kind of equipment are aware, it is more highly desirable to use tooling techniques in this regard wherein the sections of screw flights are machined all with the same diameter and wherein the variation in screw conjugation is effected by means of varying the flight tip width as generally illustrated and previously discussed in the treatment of FIGS. 5, 6, and 7. Accordingly, since most commercially available twin screw reactor equipment is fashioned in the method of varying flight tip widths, it has now been determined that strain on materials extruded through twin screw reactors so effected by means of different flight widths be expressible mathematically in terms of conjugation, whereby the discoveries and revelations of the instant invention can be most fully utilized in a cost-efficient manner, even when separate individually driven twin screw reactors are used to effect either individually, or in some combination, the mixing, impregnating, and reacting steps, either at the same, or at different speeds of rotation relative to one another.

To assist those intending such a departure from the most preferred and recommended teaching in establishing the best conditions for effecting efficient processing, the following equation is given:

$$P = \frac{\pi D_e N \theta E}{h_i Z}$$

This equation is strain multiplied by the ratio of flight tip width over the distance between the flights as measured at the flight base. As there exists no known precedent for the equation, it will be hereinafter referred to as the Petrusek equation and the resulting values for P will be referred to as Petrusek numbers. Therefore, by simply knowing the design characteristics of the screw used in any of the various extruder/reactor sections, the screw rotational speed, and the residence time of the reaction mass in that section, the corresponding Petrusek number may easily be calculated for that section.

As in the case of conjugation, depending upon the Petrusek number selected for the mixing zone of the extruder/reactor, a range of Petrusek numbers can be used for the succeeding zones; the range of ratios are supplied, infra. It is important that in using the range of ratios supplied infra, not to exceed the actual range of Petrusek numbers for any given zone. Since tooling of the individual twin screws used in tandem to effect the variation of the instant invention are fixed, the Petrusek numbers P, may most conveniently be adjusted by varying the rotating speed, relative to one another, between the separate units.

DESCRIPTION OF THE THIRD EMBODIMENT SECOND ALTERNATIVE TO THE MOST PREFERRED EMBODIMENT

As may be appreciated by those skilled in art, there are three types of ideal reactors associated with chemical reaction engineering, to wit, batch, mixed (or mixed-flow), and plug-flow. The so-called mixed-flow and plug-flow reactors are steady-state flow reactors. As may be appreciated, reaction zone III, described in our earlier work, Ser. No. 08/549,439, filed Oct. 27, 1995, and depicted in FIG. 1, corresponds to the so-called plug-flow reactor in which, in the ideal case, lateral mixing of the reaction mass is permitted but mixing or diffusion along the reaction path is not. It may be also appreciated by those skilled in the art that reactors, although modeled after these ideal cases, rarely, if ever, are ideal themselves.

Reference is made in the conduct of those tests comprising our earlier work as it relates to assessing the physical transfer of reaction mass from one zone to another or within zones, as may be appreciated from a review of the "Description of the Second Embodiment First Alternative to the Most Preferred Embodiment," supra, it was discovered, quite by accident, that it might be possible to obtain solids conversions which, although not as high as those associated with reaction zone configuration of the type described and discussed in our "Description of the Most Preferred Embodiment" and depicted in FIG. 1, could be consistent with economical processing of certain lignocellulosic feedstocks to fermentable sugars. These feedstocks may, because of their lower lignin to cellulose ratios, higher hemicellulose to lignin ratios, or physical characteristics (such as particle size), be more susceptible to attack within the mixing and impregnation zones of our invention than are other feedstocks. In any event, acid concentrations approaching the higher end of the operating limits are recommended within the mixing and impregnation zones of the extruder/reactor when working with this "Second Alternative to the Most Preferred Embodiment."

Several samples of impregnated material, having a resulting sulfuric acid concentration of approximately 61 percent in the liquid phase of the mixture were dissolved in water, at ambient temperature, and subsequently filtered, washed and dried. A solids analysis showed that a significant amount (52%) of the original dry lignocellulosic mass dissolved into the water indicating significant cleavage of the β-glucoside linkages between the individual hexosans which form the cellulose chain. Dilution of other samples of impregnated material to 8 percent acid in the liquid phase which were subsequently reacted at 121° C. in an autoclave did not alter the overall solids conversion. By comparison, through application of the apparatus of the type shown in FIG. 1, more than 60 percent solids conversion was obtained with a similar feedstock, after reaction using an acid concentration in the mixing and impregnation zones of approximately 53 percent. It may be postulated that the increased conversion associated with the most preferred embodiment can be attributed to the effect of shear provided by the twin screws in the reaction zone.

From the ease of mixing of this acid impregnated samples and water, the lack of any appreciable settling of the solids when compared to untreated feedstock or feedstock in which the acid was impregnated with a mortar and pestle (for example), and the solubility of the solids in ambient temperature water, it was concluded that in certain applications any of a number of other types of so-called plug-flow reactor designs might be used in place of the twin screw reaction zone. For example, in place of the twin screw reaction zone described in the "Description of the Most Preferred Embodiment" and the "Description of the First Alternative Preferred Embodiment," in the parent application, a hollow cylinder, such as a pipe reactor or a pipe reactor fitted with mixing elements, such as those manufactured and sold by Koch Engineering Company, Inc. can be used. It is, therefore, recommended that those interested in the practice of the instant invention conduct small-scale acid impregnation tests prior to designing full-scale systems to assess the practicality of deviating from the original teachings of our parent application, supra. Only in those cases in which there is a high degree of solids solubility in ambient temperature water (approximately 50%) should there be allowed deviation from the configurations described herein as "Description of the Most Preferred Embodiment," or the "Description of the Second Embodiment First Alternative to the Most Preferred Embodiment."

Depending on the rate constants associated with the conditions selected with the extruder/reactor, the following equation can be used to calculate the reactor space-time, which as defined by O. Levenspiel, *Chemical Reaction Engineering*, Second Edition, John Wiley & Sons, Inc., 1972, is the "time required to process one reactor volume of feed measured at specific conditions" with any plug-flow reaction zone.

$$\tau = \frac{C_0}{\Psi} * \int_{x_s}^{x_f} \frac{dX}{K_1(1-X)C_0}$$

where $C_0$ is the concentration of cellulose in reactor feed, ψ, is the fractional volume change associated with the reaction, $X_s$ and $X_f$ are the cellulose conversions at the start and finish of the reaction, and $K_1$ is the rate constant associated with the conversion of cellulose to glucose. This equation can be used to calculate space-times for so-called plug-flow reactors and as such can be used to approximate space-times for systems approximating those of reaction zone III in FIG. 1 of the parent application and the instant alternative reaction zone III (in FIG. 8).

As noted supra, in contrast to the reaction zone describe in the "Description of the Most Preferred Embodiment" of the parent application, the reaction zone of the instant alternative can be effectively isolated from the mixing and impregnation zones through the use of a simple orifice. Isolating the reaction zone from the impregnation zone precludes the possibility of backflow of process fluid from the reaction zone into the impregnation zone. Backflow of process fluid from the reaction zone to the impregnation zone can dilute the acid in the impregnation zone and, thereby, diminishes the effectiveness of the invention. Application of a dynamic plug, such as described in Rugg et al., '747, '748, '671, '079, '375, and '386, to prevent backflow of process fluid from the reaction zone to impregnation zone is not a viable option since the required dynamic plug would be at the terminus of the twin screw arrangement as opposed to an interior section as described therein, which would effectively preclude plug formation.

DESCRIPTION OF THE FOURTH EMBODIMENT THIRD ALTERNATIVE TO THE MOST PREFERRED EMBODIMENT

As may be concluded by those skilled in the art from the discussion of the "Description of the Third Embodiment Second Alternative to the Most Preferred Embodiment," supra, a so-called mixed-flow type reactor may be employed as an alternative to the so-called plug-flow type reactor when those conditions described supra exist. Space-times associated with the so-called mixed-flow reactors are considerably longer than those associated with so-called plug-flow reactors. The following equation can be used to calculate the space-time of so-called mixed-flow reactors of the instant alternative.

$$\tau = \frac{C_0}{\Psi} * \frac{X_f - X_s}{K_1(1-X_f)C_0}$$

As may be readily calculated from the space-time equations for the so-called plug-and mixed-flow reactors described supra, given a $K_1$ of 0.568 $min^{-1}$, which is the rate constant derived in the parent application from the data of Dunning et al. (*Industrial and Engineering Chemistry*), the space-time for a so-called mixed-flow reactor will be approximately 8.5 times that of a so-called plug-flow reactor for the same duty. Although appearing to have a clear advantage, the so-called plug-flow reactor may not be selected by practitioners for any of a wide variety of reasons including, for example, available on-site equipment.

For those selecting not to utilize the so-called plug-flow reactor, the following equation is provided to assist in the selection of proper impeller power numbers for the so-called mixed-flow reactor.

$$N_p = \frac{9.51\times 10^{14}\ P}{\rho N^3 D^5}$$

Where P is the motor horsepower, ρ is fluid density (1b/ft$^3$), N is impeller speed (RPM), and D is impeller diameter (inches). Impeller power numbers will vary depending on the impeller used. For example, in baffled cylindrical vessels, pitched blade turbine impellers will operate effectively at lower impeller power number than straight blade turbines (1.0–1.7 vs. 3.5–6.0). High efficiency turbines will operate effectively at lower power numbers while disk turbines must operate at higher impeller power numbers. Since other factors may play a role in determining the exact power number of a specific impeller, it is recommended that a more complete review be conducted using, for example, Bates et al., *Impeller Characteristics and Power*, Chap.3. "Mixing Theory and Practice," Academic Press, New York (1966). In general, however, since it is desired to maximize the suspension of solids, axial flow impellers, having a principal direction of discharge which coincides with the axis of the impeller rotation, should be preferred over radial flow impellers, in which the principal direction of discharge is normal to the axis rotation. From the power numbers supplied infra, other potential configurations may be readily assessed for their suitability.

INVENTION PARAMETERS

After sifting an winnowing through the data supra, as well as other results and operations of our new, novel, and improved technique, including material and information incorporated herein by reference thereto, methods and means for the effecting thereof, the operating variables, including the acceptable and preferred conditions for carrying out our invention in the four embodiments described and depicted, supra, are summarized below:

THE FIRST AND SECOND EMBODIMENTS

| Variable | Operating Limits | Preferred Limits | Most Preferred Limits |
|---|---|---|---|
| Reactor Angle degrees | 0–10 | 2–9 | 4–7 |
| Acid Concentration (mixing zone) % $H_2SO_4$ | 40–70 | 45–65 | 50–57 |
| Acid Concentration (impregnation zone) % $H_2SO_4$ | 40–70 | 45–65 | 50–57 |
| Acid Concentration (reaction zone) % $H_2SO_4$ | 5–35 | 7–25 | 10–20 |
| Acid loading lbs acid/ lb dry feedstock | 0.42–2.0 | 0.48–1.0 | 0.5–0.8 |
| Mean temperature (mixing zone) ° C. | 20–50 | 25–45 | 30–40 |
| Mean temperature (impregnation zone) ° C. | 30–60 | 32–50 | 35–45 |
| Mean temperature (reaction zone) ° C. | 100–150 | 110–140 | 120–135 |
| Mean pressure (reaction zone) pisa | 14.7–69 | 21–52 | 29–45 |
| Residence Time (mixing zone) min. | 1.75–6.0 | 2.0–5.0 | 2.5–4.0 |
| Residence Time (impregnation zone) min. | 1.75–6.0 | 2.0–5.0 | 2.5–4.0 |
| Residence Time (reaction zone) min. | 1.75–10.0 | 2.25–8.0 | 3.0–6.0 |
| Length (mixing zone) in diameters of a single screw | 9:1–65:1 | 13:1–51:1 | 19:1–39:1 |
| Length (impregnation zone) in diameters of a single screw | 9:1–65:1 | 13:1–51:1 | 19:1–39:1 |
| Length (reaction zone) in diameters of a single screw | 9:1–107:1 | 15:1–82:1 | 23:1–58:1 |
| Screw conjugation (mixing zone) % | 40–80 | 45–75 | 50–70 |
| Screw conjugation (impregnation zone) % | 50–90 | 55–85 | 60–80 |
| Screw conjugation (reaction zone) % | 60–95 | 65–92 | 70–90 |
| Conjugation ratio (impregnation zone/ mixing zone) | 1.125–1.250 | 1.130–1.220 | 1.140–1.200 |
| Conjugation ratio (reaction zone/ impregnation zone) | 1.056–1.200 | 1.082–1.180 | 1.125–1.167 |
| Screw rotational velocity RPM | 50–100 | 60–95 | 70–90 |
| Total induced strain (impregnation zone) dimensionless value | 15,600–107,100 | 21,400–84,800 | 31,200–64,200 |
| Petrusek number (mixing zone) | 6,250–85,700 | 9,640–63,600 | 15,600–45,000 |
| Petrusek number (impregnation zone) | 7,800–96,400 | 11,800–72,000 | 18,700–51,400 |
| Petrusek number (reaction zone) | 9,370–169,000 | 15,700–125,000 | 26,200–86,700 |
| Petrusek number ratio (impregnation zone/ mixing zone) | 1.125–1.250 | 1.130–1.220 | 1.140–1.200 |
| Petrusek number ratio (reaction zone/ impregnation zone) | 1.200–1.760 | 1.330–1.730 | 1.400–1.690 |

THIRD EMBODIMENT

| Variable | Operating Limits | Preferred Limits | Most Preferred Limits |
|---|---|---|---|
| Acid Concentration (mixing zone) % $H_2SO_4$ | 40–70 | 45–65 | 50–57 |
| Acid Concentration (impregnation zone) % $H_2SO_4$ | 40–70 | 45–65 | 50–57 |
| Acid Concentration (reaction zone) % $H_2SO_4$ | 5–35 | 7–25 | 10–20 |
| Acid loading lbs acid/ lb dry feedstock | 0.42–2.0 | 0.48–1.0 | 0.5–0.8 |
| Mean temperature (mixing zone) ° C. | 20–50 | 25–45 | 30–40 |
| Mean temperature (impregnation zone) ° C. | 30–60 | 32–50 | 35–45 |
| Mean temperature (reaction zone) ° C. | 100–150 | 110–140 | 120–135 |
| Mean pressure (reaction zone) pisa | 14.7–69 | 21–52 | 29–45 |

-continued

THIRD EMBODIMENT

| Variable | Operating Limits | Preferred Limits | Most Preferred Limits |
|---|---|---|---|
| Residence Time (mixing zone) min. | 1.75–6.0 | 2.0–5.0 | 2.5–4.0 |
| Residence Time (impregnation zone) min. | 1.75–6.0 | 2.0–5.0 | 2.5–4.0 |
| Residence Time (reaction zone) min. | 1.75–10.0 | 2.25–8.0 | 3.0–6.0 |
| Length (mixing zone) in diameters of a single screw | 9:1–65:1 | 13:1–51:1 | 19:1–39:1 |
| Length (impregnation zone) in diameters of a single screw | 9:1–65:1 | 13:1–51:1 | 19:1–39:1 |
| Screw conjugation (mixing zone) % | 40–80 | 45–75 | 50–70 |
| Screw conjugation (impregnation zone) % | 50–90 | 55–85 | 60–80 |
| Conjugation ratio (impregnation zone/ mixing zone) | 1.125–1.250 | 1.130–1.220 | 1.140–1.200 |
| Screw rotational velocity RPM | 50–100 | 60–95 | 70–90 |
| Total induced strain (impregnation zone) dimensionless value | 15,600–107,100 | 21,400–84,800 | 31,200–64,200 |
| Petrusek number (mixing zone) | 6,250–85,700 | 9,640–63,600 | 15,600–45,000 |
| Petrusek number (impregnation zone) | 7,800–96,400 | 11,800–72,000 | 18,700–51,400 |
| Petrusek number ratio (impregnation zone/ mixing zone) | 1.125–1.250 | 1.130–1.220 | 1.140–1.200 |

FOURTH EMBODIMENT

| Variable | Operating Limits | Preferred Limits | Most Preferred Limits |
|---|---|---|---|
| Acid Concentration (mixing zone) % $H_2SO_4$ | 40–70 | 45–65 | 50–57 |
| Acid Concentration (impregnation zone) % $H_2SO_4$ | 40–70 | 45–65 | 50–57 |
| Acid Concentration (reaction zone) % $H_2SO_4$ | 5–35 | 7–25 | 10–20 |
| Acid loading lbs acid/ lb dry feedstock | 0.42–2.0 | 0.48–1.0 | 0.5–0.8 |
| Mean temperature (mixing zone) ° C. | 20–50 | 25–45 | 30–40 |
| Mean temperature (impregnation zone) ° C. | 30–60 | 32–50 | 35–45 |
| Mean temperature (reaction zone) ° C. | 100–150 | 110–140 | 120–135 |
| Mean pressure (reaction zone) pisa | 14.7–69 | 21–52 | 29–45 |
| Residence Time (mixing zone) min. | 1.75–6.0 | 2.0–5.0 | 2.5–4.0 |
| Residence Time (impregnation zone) min. | 1.75–6.0 | 2.0–5.0 | 2.5–4.0 |
| Residence Time (reaction zone) min. | 15.0–85.0 | 19.0–68.0 | 25.5–51.0 |
| Length (mixing zone) in diameters of a single screw | 9:1–65:1 | 13:1–51:1 | 19:1–39:1 |
| Length (impregnation zone) in diameters of a single screw | 9:1–65:1 | 13:1–51:1 | 19:1–39:1 |
| Screw conjugation (mixing zone) % | 40–80 | 45–75 | 50–70 |
| Screw conjugation (impregnation zone) % | 50–90 | 55–85 | 60–80 |
| Power Number (Turbulent regime. 45° pitched-blade turbine impeller having 6 blade height ratio equal to 8. Cylindrical vessel having 4 baffles that are 1/12 the vessel's inner diameter.) | 1.0–1.7 | 1.1–1.5 | 1.3–1.4 |
| Conjugation ratio (impregnation zone/ mixing zone) | 1.125–1.250 | 1.130–1.220 | 1.140–1.200 |
| Screw rotational velocity RPM | 50–100 | 60–95 | 70–90 |
| Total induced strain (impregnation zone) dimensionless value | 15,600–107,100 | 21,400–84,800 | 31,200–64,200 |
| Petrusek number (mixing zone) | 6,250–85,700 | 9,640–63,600 | 15,600–45,000 |
| Petrusek number (impregnation zone) | 7,800–96,400 | 11,800–72,000 | 18,700–51,400 |
| Petrusek number ratio (impregnation zone/ mixing zone) | 1.125–1.250 | 1.130–1.220 | 1.140–1.200 |

These parameters represent the principal parameters that must be kept in mind in predetermining or otherwise arriving at acceptable operation of those aspects of the instant invention pertaining to concentrated acid hydrolysis.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. In a process for the concentrated acid hydrolysis of lignocellulose wherein cellulose and hemicellulose and concentrated sulfuric acid is continuously fed into at least one inlet port of a twin screw extruder/reactor; steam or superheated water or both are continuously fed into a reaction zone of said extruder/reactor, said reaction zone being downstream of said at least one inlet port; said lignocellulose continuously reacted with water in the presence of an acid catalyst at an elevated temperature in said reaction zone while being continuously conveyed to an outlet port of said extruder/reactor, and the resulting reacted cellulose or hemicellulose or both are discharged from the extruder/reactor while at elevated temperature; the improvement in combination therewith comprising maintaining said concentrated sulfuric acid and said lignocellulose in a mixing zone of said twin screw extruder/reactor at a mean temperature in a range from about 20° C. to about 50° C. and for a time sufficient to effect substantial mixing thereof; said mixing zone juxtaposed said at least one inlet port and being upstream of said reaction zone; removing from said mixing zone and introducing into an impregnation zone of said twin screw extruder/reactor at least a portion of the resulting intimately mixed lignocellulose and sulfuric acid, and maintaining same in said impregnation zone at a mean temperature in a range from about 30° C. to about 60° C. and for a time sufficient to effect substantial impregnation, with said concentrated sulfuric acid, of individual fibers comprising said lignocellulose, said impregnation zone being downstream of said mixing zone and upstream of said reaction zone; and thereafter discharging at least a portion of the resulting impregnated material from said impregnation zone to said reaction zone and maintaining said resulting discharged material in said reaction zone at a mean temperature in a range from about 100° C. to about 150° C. and for a time sufficient to effect substantial hydrolysis of said material to thereby effect conversion of from about 85 to about 95 weight percent of the pentosans and hexosans in said hemicellulose to pentose and hexose sugars, and from about 60 to about 85 weight percent of the hexosans in said cellulose to hexose sugars, and thereafter discharging the resulting sugar-rich material downstream from said reaction zone through at least one outlet orifice of said twin screw extruder/reactor.

2. The process of claim 1, wherein the ratio of screw conjugation, in said reaction zone to the screw conjugation in said impregnation zone ranges from about 1.056 to about 1.2.

3. The process of claim 2, wherein the ratio of screw conjugation, in said impregnation zone to the screw conjugation in said mixing zone ranges from about 1.125 to about 1.25.

4. The process of claim 3, wherein the concentration of said sulfuric acid introduced into said at least one inlet port ranges from between about 40 percent to about 70 percent by weight.

5. The process of claim 3, wherein the acid loading to said inlet port in relation to the feed of cellulose to said at least one inlet port on a pound of acid per pound of dry feedstock basis, respectively, ranges from about 0.42 to about 2.0.

6. The process of claim 5, wherein the residence time of the material in said mixing zone ranges from about 1.75 to about 6 minutes, the residence time of the material in said impregnation zone ranges from about 1.75 to about 6 minutes, and the residence time of the material in the reaction zone ranges from about 1.75 to about 10 minutes.

7. The process of claim 6, wherein the rotational velocity for each screw of said twin screw reactor ranges from about 50 to about 100 revolutions per minute.

8. In a process for the concentrated acid hydrolysis of cellulose, lignocellulose, or both wherein cellulose and hemicellulose and concentrated sulfuric acid is continuously fed into a first twin screw unit to effect the intimate mixing of the materials thereinto introduced; removing at least a portion of the resulting mixed material from said first twin screw unit and introducing same into a second twin screw unit and effecting the impregnation of said cellulose and hemicellulose with said concentrated sulfuric acid; removing at least a portion of the resulting impregnated material in said second twin screw unit and introducing same into a third twin screw unit along with steam or superheated water, or both, to effect in the presence of said acid, hydrolysis of said impregnated material and thereafter continuously discharging from said third twin screw unit at least a portion of the resulting reacted cellulose or hemicellulose or both; the improvement in combination therewith comprising maintaining said concentrated sulfuric acid and said lignocellulose in said first twin screw unit at a mean temperature in a range from about 20° C. to about 50° C. and for a time sufficient to effect substantial mixing thereof; maintaining the material in said second twin screw unit at a mean temperature in a range from about 30° C. to about 60° C. and for a time sufficient to effect substantial impregnation, with said concentrated sulfuric acid, of the individual fibers comprising said cellulose or said lignocellulose or both, and maintaining the material in said third twin screw unit at a mean temperature in a range from about 100° C. to about 150° C. and for a time sufficient to effect substantial hydrolysis of the material therein to thereby effect conversion of from about 85 to about 95 weight percent of the pentosans and hexosans in said hemicellulose to pentose and hexose sugars, and from about 60 to about 85 weight percent of the hexosans in said cellulose to hexose sugars, and thereafter discharging at least a portion of the resulting sugar-rich material from said third twin screw unit.

9. The process of claim 8, wherein is maintained in said third twin screw unit a Petrusek number, relative to the Petrusek number maintained in said second twin screw unit, in the range from about 1.200 to about 1.760.

10. The process of claim 9, wherein the rotational speed of said third twin screw unit, relative to the rotational speed of said second twin screw unit, is utilized to maintain said range.

11. The process of claim 9, wherein is maintained in said second twin screw unit a Petrusek number, relative to the Petrusek number maintained in said first twin screw unit, in the range from about 1.125 to about 1.250.

12. The process of claim 11, wherein the rotational speed of said second twin screw unit, relative to the rotational speed of said first twin screw unit, is utilized to maintain said range.

13. The process of claim 11, wherein the concentration of sulfuric acid introduced into said first twin screw unit ranges from between about 40 percent to about 70 percent by weight.

14. The process of claim 13, wherein the loading of acid to said first twin screw unit in relation to the loading of cellulose, on a pound of acid per pound of dry cellulose basis, respectively, ranges from about 0.42 to about 2.0.

15. The process of claim 14, wherein the residence time of the material in said first twin screw unit ranges from about 1.75 to about 6 minutes, the residence time of the material in said second twin screw unit ranges from about 1.75 to about 6 minutes, and the residence time of the material in said third screw unit ranges from about 1.75 to about 10 minutes.

16. The process of claim 15, wherein the rotational velocity in revolution per minute for each set of twin screw units ranges from about 50 to about 100 revolutions per minute.

17. The process of claim 8, wherein said first twin screw unit and said second twin screw unit are caused to rotate at substantially the same speed wherein is maintained in said second twin screw unit a degree of screw conjugation relative to the degree of screw conjugation maintained in said first twin screw unit in the range from about 1.125 to about 1.25, and wherein is maintained in said third twin screw unit a Petrusek number relative to the Petrusek number maintained in said second twin screw unit in the range of from about 1.200 to about 1.760.

18. The process of claim 17, wherein both said first twin screw unit and said second twin screw unit are caused to rotate within a common housing.

19. The process of claim 18, wherein the concentration of said sulfuric acid introduced into said first twin screw unit ranges from between about 40 percent to about 70 percent by weight.

20. The process of claim 19, wherein the loading of acid in relation to the feed of cellulose on a pound of acid per pound of dry cellulose feedstock basis, respectively, ranges from about 0.42 to about 2.0.

21. The process of claim 20, wherein the residence time of the material in said first twin screw unit ranges from about 1.75 to about 6 minutes, the residence time of the material in said second twin screw unit ranges from about 1.75 to about 6 minutes and the residence time of the material in said third twin screw unit ranges from about 1.75 to about 10 minutes.

22. In a process for the concentrated acid hydrolysis of lignocellulose wherein cellulose and hemicellulose and concentrated sulfuric acid is continuously fed into at least one inlet port of a twin screw extruder, said twin screw extruder comprising a mixing zone and an impregnation zone disposed generally downstream thereof; steam or superheated water or both are continuously fed into static-mixing means disposed generally downstream of said extruder; said lignocellulose is continuously reacted with water in the presence of an acid catalyst at an elevated temperature in said static-mixing means, and the resulting reacted cellulose or hemicellulose or both are discharged from said static-mixing means while at elevated temperature; the improvement in combination therewith comprising maintaining said concentrated sulfuric acid and said lignocellulose in said mixing zone of said twin screw extruder at a mean temperature in a range from about 20° C. to about 50° C. and for a time sufficient to effect substantial mixing thereof; said mixing zone juxtaposed said at least one inlet port and being upstream of said static-mixing means; removing from said mixing zone and introducing into said impregnation zone of said twin screw extruder at least a portion of the resulting intimately mixed lignocellulose and sulfuric acid, and maintaining same in said impregnation zone at a mean temperature in a range from about 30° C. to about 60° C. and for a time sufficient to effect substantial impregnation, with said concentrated sulfuric acid, of individual fibers comprising said lignocellulose, said impregnation zone being downstream of said mixing zone and upstream of said static-mixing means; and thereafter discharging at least a portion of the resulting impregnated material from said impregnation zone to said static-mixing means and maintaining said resulting discharged material in said static-mixing means at a mean temperature in a range from about 100° C. to about 150° C. and for a time sufficient to effect substantial hydrolysis of said material to thereby effect conversion of from about 75 to about 95 weight percent of the pentosans and hexosans in said hemicellulose to pentose and hexose sugars, and from about 50 to about 80 weight percent of the hexosans in said cellulose to hexose sugars, and thereafter discharging the resulting sugar-rich material downstream from said static-mixing means through at least one outlet orifice.

23. The process of claim 22, wherein is maintained in said impregnation zone a degree of screw conjugation, relative to the degree of screw conjugation maintained in said mixing zone, in the range from about 1.125 to about 1.25.

24. The process of claim 23, wherein the concentration of said sulfuric acid introduced into said at least one inlet port ranges from between about 40 percent to about 70 percent by weight.

25. The process of claim 24, wherein the acid loading to said at least one inlet port in relation to the feed of cellulose thereto on a pound of acid per pound of dry feedstock basis, respectively, ranges from about 0.42 to about 2.0.

26. The process of claim 25, wherein the residence time of the material in said mixing zone ranges from about 1.75 to about 6 minutes, the residence time of the material in said impregnation zone ranges from about 1.75 to about 6 minutes, and the residence time of the material in said static-mixing means ranges from about 1.75 to about 10 minutes.

27. The process of claim 26, wherein the rotational velocity for each screw of said twin screw reactor ranges from about 50 to about 100.

28. In a process for the concentrated acid hydrolysis of cellulose, lignocellulose, or both wherein cellulose and hemicellulose and concentrated sulfurfic acid is continuously fed into a first twin screw unit to effect the intimate mixing of the materials thereinto introduced; removing at least a portion of the resulting mixed material from said first twin screw unit and introducing same into a second twin screw unit and effecting the impregnation of said cellulose and hemicellulose with said concentrated sulfuric acid; removing at least a portion of the resulting impregnated material in said second twin screw unit and introducing same into static-mixing means along with steam or superheated water or both to effect in the presence of said acid, hydrolysis of said impregnated material and thereafter continuously discharging from said static-mixing means at least a portion of the resulting reacted cellulose or hemicellulose or both; the improvement in combination therewith comprising maintaining said concentrated sulfuric acid and said lignocellulose in said first twin screw unit at a mean temperature in a range from about 20° C. to about 50° C. and for a time sufficient to effect substantial mixing thereof; maintaining the material in said second twin screw unit at a mean temperature in a range from about 30° C. to about 60° C. and for a time sufficient to effect substantial impregnation with said concentrated sulfuric acid of the individual fibers comprising said cellulose or lignocellulose, and maintaining the material in said static-mixing means at a mean temperature in a range from about 100° C. to about 150° C. and for a time sufficient to effect substantial hydrolysis of the material therein to thereby effect conversion of from about 75 to about 95 weight percent of the pentosans and hexosans in said hemicellulose to pentose and hexose sugars, and from about 50 to about 80 weight percent of the hexosans in said cellulose to hexose sugars, and thereafter discharging at least a portion of the resulting sugar-rich material from said static-mixing means.

29. The process of claim 28, wherein is maintained in said second twin screw unit a Petrusek number, relative to the Petrusek number maintained in said first twin screw unit, in the range from about 1.125 to about 1.250.

30. The process of claim 29, wherein the rotational speed of said second twin screw unit, relative to the rotational speed of said first twin screw unit, is utilized to maintain said range.

31. The process of claim 29, wherein the concentration of sulfuric acid introduced into said first twin screw unit ranges from between about 40 percent to about 70 percent by weight.

32. The process of claim 31, wherein the loading of acid to said first twin screw unit in relation to the loading of cellulose, on a pound of acid per pound of dry cellulose basis, respectively, ranges from about 0.42 to about 2.0.

33. The process of claim 32, wherein the residence time of the material in said first twin screw unit ranges from about 1.75 to about 6 minutes, the residence time of the material in said second twin screw unit ranges from about 1.75 to about 6 minutes, and the residence time of the material in said static-mixing means ranges from about 1.75 to about 10 minutes.

34. The process of claim 33, wherein the rotational velocity for each set of twin screw units ranges from about 50 to about 100.

35. The process of claim 32, wherein said first twin screw unit and said second twin screw unit are caused to rotate at substantially the same speed wherein is maintained in said second twin screw unit a degree of screw conjugation relative to the degree of screw conjugation maintained in said first twin screw unit in the range from about 1.125 to about 1.25.

36. The process of claim 35, wherein both said first twin screw unit and said second twin screw unit are caused to rotate within a common housing.

37. The process of claim 36, wherein a concentrated amount of said sulfuric acid introduced into said first twin screw unit ranges from between about 40 percent to about 70 percent by weight.

38. The process of claim 37, wherein the loading of acid in relation to the feed of cellulose on a pound of acid per pound of dry cellulose feedstock basis, respectively, ranges from about 0.42 to about 2.0.

39. The process of claim 38, wherein the residence time of the material in said first twin screw unit ranges from about 1.75 to about 6 minutes, the residence time of the material in said second twin screw unit ranges from about 1.75 to about 6 minutes and the residence time of the material in said static-mixing means ranges from about 1.75 to about 10 minutes.

40. In a process for the concentrated acid hydrolysis of lignocellulose wherein cellulose and hemicellulose and concentrated sulfuric acid is continuously fed into at least one inlet port of a twin screw extruder, said twin screw extruder comprising a mixing zone and an impregnation zone disposed generally downstream thereof; steam or superheated water or both are continuously fed into mixed-flow means disposed generally downstream of said extruder; said lignocellulose is continuously reacted with water in the presence of an acid catalyst at an elevated temperature in said mixed-flow means, and the resulting reacted cellulose or hemicellulose or both are discharged from said mixed-flow means while at elevated temperature; the improvement in combination therewith comprising maintaining said concentrated sulfuric acid and said lignocellulose in said mixing zone of said twin screw extruder at a mean temperature in a range from about 20° C. to about 50° C. and for a time sufficient to effect substantial mixing thereof; said mixing zone juxtaposed said at least one inlet port and being upstream of said mixed-flow means; removing from said mixing zone and introducing into said impregnation zone of said twin screw extruder at least a portion of the resulting intimately mixed lignocellulose and sulfuric acid, and maintaining same in said impregnation zone at a mean temperature in a range from about 30° C. to about 60° C. and for a time sufficient to effect substantial impregnation, with said concentrated sulfuric acid, of individual fibers comprising said lignocellulose, said impregnation zone being downstream of said mixing zone and upstream of said mixed-flow means; and thereafter discharging at least a portion of the resulting impregnated material from said impregnation zone to said mixed-flow means and maintaining said resulting discharged material in said mixed-flow means at a mean temperature in a range from about 100° C. to about 150° C. and for a time sufficient to effect substantial hydrolysis of said material to thereby effect conversion of from about 75 to about 95 weight percent of the pentosans and hexosans in said hemicellulose to pentose and hexose sugars, and from about 50 to about 80 weight percent of the hexosans in said cellulose to hexose sugars, and thereafter discharging the resulting sugar-rich material downstream from said mixed-flow means through at least one outlet orifice.

41. The process of claim 40, wherein is maintained in said impregnation zone a degree of screw conjugation, relative to the degree of screw conjugation maintained in said mixing zone, in the range from about 1.125 to about 1.25.

42. The process of claim 40, wherein the concentration of said sulfuric acid introduced in to said twin screw extruder ranges from between about 40 percent to about 70 percent by weight.

43. The process of claim 42, wherein the acid loading to said at least one inlet port in relation to the feed of cellulose thereto on a pound of acid per pound of dry feedstock basis, respectively, ranges from about 0.42 to about 2.0.

44. The process of claim 43, wherein the residence time of the material in said mixing zone ranges from about 1.75 to about 6 minutes, the residence time of the material in said impregnation zone ranges from about 1.75 to about 6 minutes, and the residence time of the material in the mixed-flow means ranges from about 15 to about 85 minutes.

45. The process of claim 44, wherein the rotational velocity for each screw of said twin screw reactor ranges from about 50 to about 100 revolutions per minute.

46. In a process for the concentrated acid hydrolysis of cellulose, lignocellulose, or both wherein cellulose and hemicellulose and concentrated sulfuric acid is continuously fed into a first twin screw unit to effect the intimate mixing of the materials thereinto introduced; removing at least a portion of the resulting mixed material from said first twin screw unit and introducing same into a second twin screw unit and effecting the impregnation of said cellulose and hemicellulose with said concentrated sulfuric acid; removing at least a portion of the resulting impregnated material in said second twin screw unit and introducing same into mixed-flow means along with steam or superheated water, or both, to effect in the presence of said acid, hydrolysis of said impregnated material and thereafter continuously discharging from said mixed-flow means at least a portion of the resulting reacted cellulose or hemicellulose or both; the improvement in combination therewith comprising maintaining said concentrated sulfuric acid and said lignocellulose in said first twin screw unit at a mean temperature in a range from about 20° C. to about 50° C. and for a time sufficient to effect substantial mixing thereof; maintaining the material in said second twin screw unit at a mean temperature in a range from about 30° C. to about 60° C. and for a time sufficient to effect substantial impregnation with said concentrated sulfuric acid of the individual fibers comprising said cellulose or lignocellulose, and maintaining the material in said mixed-flow means at a mean temperature in a range from about 100° C. to about 150° C. and for a time sufficient to effect substantial hydrolysis of the material therein to thereby effect conversion of from about 75 to about 95 weight percent of the pentosans and hexosans in said hemicellulose to pentose and hexose sugars, and from about 50 to about 80 weight percent of the hexosans in said cellulose to hexose sugars, and thereafter discharging at least a portion of the resulting sugar-rich material from said mixed-flow means.

47. The process of claim 46, wherein is maintained in said second twin screw unit a Petrusek number, relative to the Petrusek number maintained in said first twin screw unit, in the range from about 1.125 to about 1.250.

48. The process of claim 47, wherein the rotational speed of said second twin screw unit, relative to the rotational speed of said first twin screw unit, is utilized to maintain said range.

49. The process of claim 47, wherein the concentration of sulfuric acid introduced into said first twin screw unit ranges from between about 40 percent to about 70 percent by weight.

50. The process of claim 49, wherein the loading of acid to said first twin screw unit in relation to the loading of cellulose, on a pound of acid per pound of dry cellulose basis, respectively, ranges from about 0.42 to about 2.0.

51. The process of claim 50, wherein the residence time of the material in said first twin screw unit ranges from about 1.75 to about 6 minutes, the residence time of the material in said second twin screw unit ranges from about 1.75 to about 6 minutes, and the residence time of the material in said mixed-flow means ranges from about 15 to about 85 minutes.

52. The process of claim 51, wherein the rotational velocity for each set of twin screw units ranges from about 50 to about 100 revolutions per minute.

53. The process of claim 50, wherein said first twin screw unit and said second twin screw unit are caused to rotate at substantially the same speed wherein is maintained in said second twin screw unit a degree of screw conjugation relative to the degree of screw conjugation maintained in said first twin screw unit in the range from about 1.125 to about 1.25.

54. The process of claim 53, wherein both said first twin screw unit and said second twin screw unit are caused to rotate within a common housing.

55. The process of claim 54, wherein the concentration of said sulfuric acid introduced into said first twin screw unit ranges from between about 40 percent to about 70 percent by weight.

56. The process of claim 55, wherein the loading of acid in relation to the feed of cellulose on a pound of acid per pound of dry cellulose feedstock basis, respectively, ranges from about 0.42 to about 2.0.

57. The process of claim 56, wherein the residence time of the material in said first twin screw unit ranges from about 1.75 to about 6 minutes, the residence time of the material in said second twin screw unit ranges from about 1.75 to about 6 minutes and the residence time of the material in said mixed-flow means ranges from about 15 to about 85 minutes.

* * * * *